United States Patent
Plattner et al.

(10) Patent No.: US 9,424,282 B2
(45) Date of Patent: Aug. 23, 2016

(54) ONLINE REORGANIZATION OF HYBRID IN-MEMORY DATABASES

(71) Applicant: Hasso-Plattner-Institut für Softwaresystemtechnik GmbH, Potsdam (DE)

(72) Inventors: Hasso Plattner, Schriesheim (DE); Martin Grund, Fribourg (CH); Jens Krueger, Oranienburg (DE)

(73) Assignee: HASSO-PLATTNER-INSTITUT FUR SOFTWARESYSTEMTECHNIK GMBH, Potsdam (DE)

( * ) Notice: Subject to any disclaimer, the term of this patent is extended or adjusted under 35 U.S.C. 154(b) by 513 days.

(21) Appl. No.: 13/786,004

(22) Filed: Mar. 5, 2013

(65) Prior Publication Data

US 2013/0232176 A1 Sep. 5, 2013

Related U.S. Application Data

(60) Provisional application No. 61/606,487, filed on Mar. 5, 2012.

(51) Int. Cl.
*G06F 17/30* (2006.01)

(52) U.S. Cl.
CPC .... *G06F 17/30289* (2013.01); *G06F 17/30286* (2013.01)

(58) Field of Classification Search
CPC .................................................. G06F 17/30306
USPC ........................................................ 707/803
See application file for complete search history.

(56) References Cited

U.S. PATENT DOCUMENTS

| | | | |
|---|---|---|---|
| 6,466,931 B1 * | 10/2002 | Attaluri et al. | |
| 2008/0215531 A1 * | 9/2008 | Markl et al. | 707/2 |
| 2008/0243949 A1 | 10/2008 | Anguelov | |
| 2009/0100004 A1 * | 4/2009 | Andrei et al. | 707/2 |
| 2010/0223253 A1 * | 9/2010 | Gopal et al. | 707/713 |
| 2010/0235348 A1 | 9/2010 | Baby et al. | |
| 2011/0022586 A1 * | 1/2011 | Wilkinson et al. | 707/720 |
| 2011/0093479 A1 | 4/2011 | Fuchs | |
| 2012/0265728 A1 | 10/2012 | Plattner et al. | |
| 2014/0214793 A1 * | 7/2014 | Tatemura et al. | 707/713 |

OTHER PUBLICATIONS

Article entitled "A Demonstration of Hyrise—A Main Memory Hybrid Storage Engine", by Grund et al., dated Sep. 3, 2011.*
Article entitled "HYRISE—A Main Memory Hybrid Storage Engine", by Grund et al., Copyright 2010.*

(Continued)

*Primary Examiner* — Mahesh Dwivedi
(74) *Attorney, Agent, or Firm* — Fountainhead Law Group P.C.

(57) ABSTRACT

A system and method that dynamically adapts to workload changes and adopts the best possible physical layout on the fly—while allowing simultaneous updates to the table. A process continuously and incrementally computes the optimal physical layout based on workload changes and determines whether or not switching to this new layout would be beneficial. The system can perform online reorganization of hybrid main memory databases with a negligible overheard, leading up to three orders of magnitude performance gains when determining the optimal layout of dynamic workloads and providing guarantees on the worst case performance of our system.

20 Claims, 6 Drawing Sheets

(56) References Cited

OTHER PUBLICATIONS

Article entitled "Towards Cost-Effective Storage Provisioning for DBMSs", by Zhang et al., Copyright 2011.*
Article entitled "An overview of HYRISE—a Main Memory Hybrid Storage Engine", by Grund et al., Copyright 2012.*
Extended European Search Report dated Aug. 6, 2013 for European Patent Application No. 13157904.7.
Grund, Martin, "HYRISE: A Main Memory Hybrid Database Storage Engine", Thesis, Hasso Plattner Institute, Potsdam, Germany, Jun. 24, 2012, 190 pages.
Grund et al: "HYRISE-A Main Memory Hybrid Storage Engine"; Proceedings of the VLDB Endowment, vol. 4, No. 2, Copyright 2010, VLDB Endowment 2150-8097/10111; 12 pages.
Hankins et al.: "Data Morphing: An Adaptive, Cache-Conscious Storage Technique", proceedings of the 29th VLDB Conference, Berlin, Germany, 2003; 12 pages.
Beier et al.: "Online Reorganization in Read Optimized MMDBS", SIGMOD'11, Jun. 12-16, 2011, Athens, Greece, Copyright 2011 ACM 978-1-4503-0661-4/11/06; 12 pages.
Sockut et al.: "Database Reorganization—Principles and Practice", Computing Surveys, vol. 11, No. 4, Dec. 1979; 25 pages.
Sockut et al: "Online Reorganization of Databases", ACM Computing Surverys, vol. 41, No. 3, Article 14, Publication date: Jul. 2009; 136 pages.
Markowitz et al: "Incremental Reorganization of Relational Databases", Proceedings of the 13th VLDB Conference, Brighton 1987; 9 pages.
Krueger et al.: "Fast Updates on Read-Optimized Databases Using Multi-Core CPUs". Proceedings of the VLDB Endowment, vol. 5, No. 1, Copyright 2011 VLDB Endowment 2150-8097/11/09; 12 pages.
Agrawal et al.: "Automatic Physical Design Tuning: Workload as a Sequence", Conference '06, Jun. 26-29, 2006, Chicago, IL, USA; 12 pages.
Stonebraker et al.: "C-Store: A Column-oriented DBMS", Proceedings of the 31st VLDB Conference, Trondheim, Norway, 2005; 12 pages.
Nicolas Bruno: "Automated Physical Database Design and Tuning", Practical Aspects in Physical Database Design, Chapter 7; 2011, 21 pages.
Bruno et al.: "To Tune or not to Tune? A Lightweight Physical Design Alerter", VLDB D6, Sep. 12-15, 2006, Seoul, Korea; 12 pages.
Ailamaki et al.: "Weaving Relations for Cache Performance", Proceedings of the 27th VLDB Conference, Roma, Italy, 2001; 12 pages.
Ailamaki et al.: "DBMSs on a Modern Processor: Where Does Time Go?", Proceedings of the 25th VLDB Conference, Edinburgh, Scotland, 1999; 12 pages.
Abadi et al.: "Materialization Strategies in a Column-Oriented DBMS", 2007 IEEE; 10 pages.
Abadi et al.: "Integrating Compression and Execution in Column-Oriented Database Systems", SIGMOD 2006, Jun. 27-29, 2006, Chicago, Illinois, USA; 12 pages.
Abadi et al.: "Column-Stores vs. Row-Stores: How Different Are They Really?", SIGMOD '08, Jun. 9-12, 2008, Vancouver, BC, Canada; 14 pages.
Agrawal et al.: "Integrating Vertical and Horizontal partitioning into Automated Physical Database Design", SIGMOD 2004, Jun. 13-18, 2004, Paris, France; 12 pages.
Boncz et al.: "Breaking the Memory Wall in MoneyDB", Dec. 2008, vol. 51, No. 12, Communications of the ACM; 9 pages.
Boncz et al.: "Database Architecture Optimized for the new Bottleneck: Memory Access", proceedings of the 25th VLDB Conference, Edinburgh, Scotland, 1999; 12 pages.
Bog et al.: "A Mixed Transaction Processing and Operational Reporting Benchmark", Oct. 30, 2010, Springer Science +Business Media, LLC 2010; 15 pages.
Babka et al.: "Investigating Cache Parameters of x86 Family Processors", SPEC Benchmark Workshop 2009, LNCS 5419, 22 pages.

Boncz et al.: "MonetDB/X100: Hyper-Pipelining Query Execution", Proceedings of the 2005 CIDR Conference; 13 pages.
Chen et al.: "TPC-E vs. TPC-C: Characterizing the New TPC-E Benchmark via an I/O Comparison Study", ACM SIGMOD Record, vol. 39, Issue 3, Sep. 2010, 6 pages.
Codd et al.: "Providing OLAP to User-Analysts: An I Mandate", EF Codd Associates, Copyright 1993 by E.F. Codd & Associates, 24 pages.
"The Mixed Workload CH-benCHmark", Dagstuhl "Robust Query Processing" Breakout Group "Workload Management", DBTest 11, Jun. 6, 2011, Athens, Greece, Copyright 2011, ACM 978-1-4503-0655-3/11/06, 6 pages.
Copeland et al.: "A Decomposition Storage Model", 1985 ACM 0-89791-160-1/85/005/0268, 12 pages.
Chaudhuri et al.: "Self-Tuning Database Systems: A Decade of Progress", VLDB '07, Sep. 23-28, 2007, Vienna, Austria, ACM 978-1-59593-649-3/07/09; 12 pages.
Ceri et al.: "Horizontal Data Partitioning in Database Design", Istituto di Elettrotecnica ed Elettronica, 1982 ACM 3-89791-073-7/82/006/0128, 9 pages.
Cha et al.: "P*TIME: Highly Scalable OLTP DBMS for Managing Update-Intensive Stream Workload", Proceedings of be 30th VLDB Conference, Toronto, Canada, 2004, 12 pages.
Ceri et al.: "Deriving Production Rules for Incremental View Maintenance", Proceedings of the 17th International Conference on Very Large Data Bases, Barcelona, Sep. 1991, 13 pages.
Mark N. Frolick & Thilini R. Ariyachandra (2006) Business Performance Management: One Truth, Information Systems Management, 23:1, 41-48, DOI: 10.1201/1078.10580530/45769.23.1.20061201/97771.5; 9 pages.
Farber et al.: "SAP HANA Database—Data Management for Modern Business Applications", SIGMOD Record, Dec. 2011, (Vo.. 40, No. 4), 7 pages.
French: "'One Size Fits All' Database Architectures Do No Work for DSS", SIGMOD '95, San Jose, CA USA, ACM 3-89791-731-6/95/0005, 2 pages.
French: "Teaching an OLTP Database Kernel Advanced Datawarehousing Techniques", 1997 IEEE, 5 pages.
Grund et al.: "An overview of HYRISE—a main Memory Hybrid Storage Engine", Bulletin of the IEEE Computer Society Technical Committee on Data Engineering, 2012 IEEE, 6 pages.
Grund et al.: "A Demonstration of HYRISE—a Main Memory Hybrid Storage Engine", proceedings of the VLDB Endowment, vol. 4, No. 12, Aug. 29-Sep. 3, 2011, 4 pages.
Goetz Graefe: "Query Evaluation Techniques for Large Databases", ACM Computing Surveys, vol. 25, No. 2, Jun. 1993, 98 pages.
Goetz Graefe: Volcano—an Extensible and Parallel Query Evaluation System, 1994 IEEE, 16 pages.
Grund et al.: "The Effects of Virtualization on Main Memory Systems", DAMON '10, Indianapolis, IN USA, Copyright 2010 ACM 978-1-4503-0189-3, 6 pages.
Halim et al.: "Stochastic Database Cracking: Towards Robust Adaptive Indexing in Main-Memory Column-Stores", Proceedings of the VLDB Endowment, vol. 5, No. 6, Aug. 27-31, 2012, Istanbul, Turkey, 12 pages.
Hammer et al.: "A Heuristic Approach to Attribute Partitioning", 1979 ACM 0-89791-001-x17910500-0093, 9 pages.
Hoffer et al.: "The Use of Cluster Analysis in Physical Data Base Design", VLDB '75 Proceedings of te 1st International conference on Very Large Data Bases; 18 pages.
Idreos et al.: "Database Cracking", CIDR 2007, 11 pages.
Jones et al.: "Low Overhead Concurrency Control for Partitioned Main Memory Databases", SIGMOD '10, Jun. 6-11, 2010, Indianapolis, IN, USA, 12 pages.
Johnson et al.: "Scalability of write-ahead logging on multicore and multisocket hardware", The VLDB Journal, Feb. 23, 2011, 25 pages.
Khoshafian et al.: "A Query Processing Strategy for the Decomposed Storage Model", Microelectronics and Computer Technology Corporation, Austin, TX, 1987 IEEE, 8 pages.
Krueger et al.: "Enterprise Application-specific Data Management", 2010 14th IEEE International Enterprise Distributed Object Computing Conference, 10 pages.

(56) References Cited

OTHER PUBLICATIONS

Karypis et al.: "Multilevel k-way Partitioning Scheme for Irregular Graphs", Journal of Parallel and Distributed Computing 48, 96-129 (1998) article No. PC971404, 34 pages.
Kallman et al.: "H-Store: A High-Performance, Distributed Main Memory Transaction Processing System", VLDB '08, Aug. 24-30, 2008, Auckland, New Zealand, 4 pages.
Kemper et al.: "HyPer: Adapting Columnar Main-Memory Data Management for Transactional AND Query Processing", Bulletin of the IEEE Computer Society Technical Committee on Data Engineering, Copyright 2012 IEEE, 6 pages.
Kim et al.: "Sort vs. Hash Revisited: Fast Join Implementation on Modem Multi-core CPUs", VLDB '09, Aug. 24-28, 2009 Lyon, France, 12 pages.
Lee et al.: "Differential Logging: A Commutative and Associative Logging Scheme for Highly Parallel Main Memory Database", 2001 IEEE, 10 pages.
Legler et al.: "Data Mining with the SAP NetWeaver BI Accelerator", VLDB '06, Sep. 12-15, 2006, Seoul, Korea, 10 pages.
Lakshman et al.: "Cassandra—A Decentralized Structured Storage System", ACM SIGOPS Operating Systems Review, vol. 44, Issue 2, Apr. 2010, 4 pages.
Lemke et al., "Kompressionstechniken fur spaltenorientierte BI-Accelerator-Losungen", BTW 2009, DBIS, Proceedings, Mar. 2-6, 2009, 12 pages.
Boncz et al.: "Database Architecture Optimized for the new Bottleneck: Memory Access", Proceedings of the 25th VLDB Conference, Edinburgh, Scotland, 1999, 12 pages.
Manegold et al.: "Generic Database Cost Models for Hierarchical Memory Systems", Proceedings of the 28th VLDB Conference, Hong Kong, China, 2002, 1 pages.
MacNicol et al.: "Sybase IQ Multiplex—Designed for Analytics", Proceedings of the 30th VLDB Conference, Toronto, Canada, 2004, 4 pages.
Navathe et al.: "Vertical Partitioning Algorithms for Database Design", ACM Transactions on Database Systems, vol. 9, No. 4, Dec. 1984, 31 pages.
Hasso Plattner: "A Common Database Approach for OLTP and OLAP Using an In-Memory Column Database", SIGMOD '09, Jun. 29-Jul. 2, 2009, providence, RI, USA, 7 pages.
Plattner et al.: "In-Memory Data Management, An Inflection Point for Enterprise Applications", Springer-Verlag Berlin Heidelberg 2011, 245 pages.
Rosenblum et al.: "The Impact of Architectural Trends on Operating System Performance", Proceedings of the 15th ACM Symposium on Operating Systems Principles (SOSP) Copper Mountain, 1995, 14 pages.
Ramamurthy et al.: "A Case for Fractured Mirrors", proceedings of the 28th VLDB Conference, Hong Kong, China, 2002, 12 pages.
George W. Reitwiesner: "The First Operating System for the EDVAC", IEEE Annals of the History of Computing, vol. 19, No. 1, 1997, 5 pages.
Rao et al.: "Automating Physical Database Design in a Parallel Database", ACM SIGMOD 2002, Jun. 4-6, Madison Visconsin, USA; 12 pages.
Schaffner et al.: "A Hybrid Row-column OLTP Database Architecture for Operational Reporting", PowerPoint Presentation, Aug. 24, 2008, 14 pages.
Abraham Silberschatz: "A Multi-Version Concurrency Scheme With No Rollbacks", 1982 ACM, 8 pages.
Stonebraker et al.: The End of an Architectural Era (It's Time for a Complete Rewrite), VLDB '07, Sep. 23-28, 2007, 10 pages.
Stonebraker et al.: "The Implementation of Postgres", IEEE, Mar. 1990, 36 pages.
Shao et al.: "Clotho: Decoupling Memory Page Layout from Storage Organization", Proceedings of the 30th VLDB Conference, Toronto, Canada, 2004, 12 pages.
Michael Stonebraker: "Technical Perspective One Size Fits All: An Idea Whose Time has Come and Gone", Communication of the ACM, Dec. 2008, vol. 51, No. 12, 1 page.
Tinnefeld et al.: "Available-To-Promise on an In-Memory Column Store", DBLP Conference Paper Jan. 2011, 20 pages.
Westmann et al.: "The Implementation and Performance of Compressed Databases", ACM SIGMOD Record, 2000, 6 pages.
Westmann et al.: "The Implementation and Performance of Compressed Databases", ACM SIGMOD Record, 2000, 13 pages.
Zukowski et al.: "DSM vs. NSM: CPU Performance Tradeoffs in Block-Oriented Query Processing", DaMoN 2008, Jun. 13, 2008, Vancouver, Canada, 8 pages.
Zhou et al.: "A Multi-resolution Block Storage Model for Database Design", Columbia University Computer Science Technical Reports, 2003, 6 pages.
Bill Inmon: "Operational and Informational Reporting", Information Management Magazine, Jul. 1, 2000, 2 pages.
Krueger et al.: "A Case for Online Mixed Workload Processing", DBTest 2010, Proceedings of the Third International Workshop on Testing Database Systems, Article No. 8, 12 pages.

* cited by examiner

ONLINE REORGANIZATION OF HYBRID IN-MEMORY DATABASES

CROSS REFERENCE TO RELATED APPLICATIONS

This application claims the benefit of U.S. Provisional Application No. 61/606,487, filed on Mar. 5, 2012, entitled "Online Reorganization of Hybrid In-Memory Databases", which is incorporated herein by reference.

OVERVIEW

The present invention relates to a computer-implemented database online reorganization method for dynamically adapting a database layout of a database.

Unless otherwise indicated herein, the approaches described in this section are not prior art to the claims in this application and are not admitted to be prior art by inclusion in this section or in the following sections.

Hybrid main-memory database systems—capable of storing data both in a horizontal (tuple store) and in a vertical (column store) manner, are gaining traction due to their flexibility and high efficiency. The problem of how to store data in such systems, i.e., of picking the right physical layout for the data and workload at hand, is central to those systems and is usually solved offline. While determining the optimal layout in advance for a given database workload is possible, it typically leads to sub-optimal layouts for a large fraction of enterprise application databases where the workload is constantly changing or exhibits some periodic behavior. In this application, we present a system that can dynamically adapt to the workload changes and adopts the best possible physical layout on the fly—while allowing simultaneous updates to the table. We present a process that is able to continuously and incrementally compute the optimal physical layout based on workload changes and to determine whether or not switching to this new layout would be beneficial. In addition, we present an efficient solution to the process of rewriting the tables taking into account both read and write-optimized partitions. We experimentally show that our research prototype HYRISE can perform online reorganization of hybrid main memory databases with a negligible overheard, leading up to three orders of magnitude performance gains when determining the optimal layout of dynamic workloads and providing guarantees on the worst case performance of our system.

1. INTRODUCTION

Hybrid, in-memory databases provide significant advantages to many modern enterprise applications due to their flexibility (they can store data horizontally or vertically depending on the workload) and their high-efficiency. Exploiting sequential access as often as possible and optimizing the layout to match the application workload is essential to optimize such systems.

In [M. Grund, J. Krüger, H. Plattner, A. Zeier, P. Cudré-Mauroux, and S. Madden. HYRISE—A Main Memory Hybrid Storage Engine. PVLDB, 4(2):105-116, 2010], which is incorporated herein by reference, we showed how important it is to provide an optimized workload-aware storage layer to achieve the best possible performance. For enterprise applications relying on pre-defined workloads, it is thus possible to derive the applications workload in advance and thus generate the optimal layout offline using a sample workload.

However, this static solution falls short for all enterprise applications showing an evolving or periodic workload (e.g. daytime transactional processing, preparing analytical reports during the night), since the entire workload must be taken into account and analyzed to identify the optimal layout at every point in time. The more complex the workload, the longer it takes to determine the optimal physical layout. For many enterprise systems, such as an SAP enterprise system counting more than 70,000 tables, continually re-computing and possibly adopting the optimal layout for frequently evolving workloads would be absurd as this would consume the majority of the available resources (see Section 6).

On the other hand, if the database system does not adapt to the new workload, it will gradually lose in performance and eventually be stuck with a physical layout that is inappropriate to the current context. Database downtime is not acceptable for tuning or reorganization purposes since it would lead to higher cost on the application side and the reorganization process and workload analyzer needs to be fast enough to perform these tasks online. In this application, we present a solution to the problem of evolving workloads for in-memory enterprise applications, based on three main principles:

(a) Efficient and incremental computation of optimal layouts given continuously evolving workloads
(b) Continuous amortization of physical layout adjustment
(c) Efficient and online reorganization of the physical layout To address (a) we present a new process that allows incrementally calculating a new layout upon workload change. In contrast to other solutions the process does not need to examine the complete workload and all tables but can specifically identify all relevant partitions. Thus, this process is able to handle a large number of tables in enterprise applications and can keep up with frequently changing workloads.

To avoid frequent layout changes (b), our system tries to amortize the cost of each adjustment to the physical layout. We characterize the tradeoff between frequent layout changes—yielding high transition costs—and relatively stable layouts—yielding higher query execution costs when the workload is evolving—in Section 4.

Even though workload computation and layout generation have been considered by other systems like DataMorphing [R. A. Hankins and J. M. Patel. Data Morphing: An Adaptive, Cache-Conscious Storage Technique. In VLDB, pages 417{428, 2003], one important aspect has not yet been addressed: How to handle online reorganization. In HYRISE, we are able to modify our re-compression process to allow complete data reorganization during the so called merge phase. By applying this modification—as mentioned in (c)—we provide a solution where the table layout becomes flexible and adapts over time. In contrast to the work presented in [F. Beier, K. Stolze, and K.-U. Sattler. Online reorganization in read optimized MMDBS. In Proceedings of the ACM SIGMOD, pages 1125-1136. ACM, 2011] our system works directly on the primary data source and is not designed to optimize a secondary system.

To highlight the relevance of our approach, we emphasize on a common scenario: During the day our system executes a workload W1 where 10,000 transactional queries are run that materialize tuples with a selectivity of 0.001, in addition per each epoch we run 200 analytical queries performing a full attribute scan on the input table. We define an epoch as the bounding time interval for treating the workload as an atomic set of queries. Our sample table has 1M tuples with 100 attributes. During the night the workload changes and now 1000 analytical queries and 1000 transactional queries per epoch are reported, thus yielding a second optimal layout for this epoch.

During the different periods of the day, only one of the two layouts λ1 and λ2 is optimal. In current systems one can chose from the lesser of the two evils. If the system chooses λ1 as the optimal layout, during the day it will achieve a factor 4 performance gain, but during the second part of the day will be approximately 3 times slower than the other comparable layout. When we apply the processes presented in this paper we can specifically address this problem: We keep track of the cyclic history of workloads and thus adapt fast to new layouts and second we are able to compute the optimal layout in a short time. Thus it becomes possible to always provide the optimal layout for this table.

Specifically we make the following contributions:
1. We show how to leverage delta-merge and re-compression operations to modify the layout of an input table with negligible overhead costs.
2. We present an incremental layout process that allows calculating the optimal layout directly during system run-time.
3. We characterize the tradeoff between frequent and infrequent layout adaptation and propose a process to amortize layout transition costs.
4. We present a system architecture that allows performing the reorganization of the modified relations in an effective and scalable way minimizing the overhead for online reorganization.
5. We perform a thorough evaluation of our approach implemented in our HYRISE prototype.

The remainder of the description is structured as the following: First we present the related work in Section 2 and describe the architectural properties of our system and explain our design decisions in Section 3. Section 4 describes our novel incremental layout change process and how we leverage its properties. In Section 5 we describe our workload evaluation process. We evaluate our implementation and demonstrate the advantage of our incremental online reorganization framework and of the workload evaluation process experimentally in Section 6. Section 7 summarizes the results and presents future research directions.

TABLE 1

Cost comparisons for two workloads on a simple relation reporting the number of CPU cycles in $10^9$

| Description | Workload $W_1$ | Workload $W_2$ |
|---|---|---|
| Layout $\lambda_1$ | 24.1 | 100 |
| Layout $\lambda_2$ | 99.9 | 30.8 |

2. RELATED WORK

Database reorganization is a widely discussed research topic that is as old as databases themselves [G. H. Sockut and R. P. Goldberg. Database Reorganization—Principles and Practice. ACM Comput. Surv., 11(4):371-395, 1979.]. However, classical reorganization approaches were executed offline and thus required the database to shutdown. The increase in processor speed and the general availability of large amounts of main memory allowed to rethink such approaches and to envision online reorganization of databases. In a recent, survey Sockut et al. [G. H. Sockut and B. R. Iyer. Online reorganization of databases. ACM Comput. Surv., 41(3), 2009] define two dimensions in online reorganization. The first dimension defines categories of reorganization like tasks involving conversion between indexing and hashing or restoration of clustering. The second dimension defines issues of reorganization like the use of partitions. In this application we only consider the second dimension. Furthermore for our reorganization framework we consider database reorganization as a reformatting and restructuring operation without modifying the content itself, as stated by Sockut and Iyer in [G. H. Sockut and B. R. Iyer. Online reorganization of databases. ACM Comput. Surv., 41(3), 2009].

In addition to structural modifications and reformatting of attributes, database reorganization can sometimes refer to changing the logical structure of the data by adding or removing new attributes to a given table. These operations are typically referred to as schema evolution [V. M. Markowitz and J. A. Makowsky. Incremental Reorganization of Relational Databases. In VLDB, pages 127-135. Morgan Kaufmann, 1987] and are not the focus of the present work. Data degeneration is not covered by our approach since HYRISE cyclically performs a recompression operation, see [J. Krüger, C. Kim, M. Grund, N. Satish, D. Schwalb, J. Chhugani, H. Plattner, P. Dubey, and A. Zeier. Fast Updates on Read-Optimized Databases Using Multi-Core CPUs. PVLDB, 5(1):61-72, 2011] which is incorporated herein by reference, and thus avoids any degeneration in terms of unused or fragmented memory and loss of compression.

Recent research in database reorganization can be split in two different directions: The first approach only modifies the original relational table, while the second approach considers modifying secondary data structures as indices or materialized views.

The work of Beier et al. [F. Beier, K. Stolze, and K.-U. Sattler. Online reorganization in read optimized MMDBS. In Proceedings of the ACM SIGMOD, pages 1125-1136. ACM, 2011] belongs to the first category and is closest to our work. They show how to implement online reorganization for main memory database systems focusing on data structure degradation. However, while our prototype supports a constant flow of single inserts or updates, the former system is optimized for batch updates. In a mixed workload scenario, immediate visibility is a strict requirement and it is thus not possible to optimize for batch updates only. In addition, HYRISE is build to be the central database instance, thus serving as the primary data source, while the ISAOPT of Beier et al. serves as a secondary data sink.

The work of Agrawal et al. [S. Agrawal, E. Chu, and V. R. Narasayya. Automatic physical design tuning: workload as a sequence. In Proceedings of the ACM SIGMOD, pages 683-694. ACM, 2006] belongs to the second category. They present a novel approach to physical database design tuning by treating the workload as a sequence. Our approach shares with their work the idea of treating the input as a sequence of operations that are handled independently. However, they focus on physical database design based on memory consumption as an upper bound, while the layout design in HYRISE directly works on the primary storage. In addition, their system originates form a initial state and has a finite state while in HYRISE we have to observe the system constantly. Furthermore, while the sequence of queries is important for their system due to additional data structures and upper storage bounds, it does not play a large role in our context, since we do not need to consider an upper storage bound and simply can look at the total workload in our case.

In [N. Bruno. Automated physical database design and tuning. Emerging Directions in Database Systems and Applications. Taylor and Francis, 2011], finally, Bruno discusses different approaches for online database reorganization. However, in contrast to our approach, Bruno focuses on the creation and dropping of indexes as a possible optimization. As a result, the outcome of his performance optimization is binary: Either the index is used (optimizing the workload) or it is not used. In a dynamic system like HYRISE there can be multiple different layouts that result in gradually different performance. Also, the upper bound of our worst case penalty is dependent on the workload instead of the transition costs.

SUMMARY OF THE INVENTION

Hybrid main-memory database systems—capable of storing data both in a horizontal (tuple store) and in a vertical (column store) manner, are gaining traction due to their flexibility and high efficiency. The problem of how to store data in such systems, i.e., of picking the right physical layout for the data and workload at hand, is central to those systems and is usually solved offline. While determining the optimal layout in advance for a given database workload is possible, it typically leads to sub-optimal layouts for a large fraction of enterprise application databases where the workload is constantly changing or exhibits some periodic behavior. In this paper, we present a system that can dynamically adapt to the workload changes and adopts the best possible physical layout on the fly—while allowing simultaneous updates to the table. We present a process that is able to continuously and incrementally compute the optimal physical layout based on workload changes and to determine whether or not switching to this new layout would be beneficial. In addition, we present an efficient solution to the process of rewriting the tables taking into account both read and write-optimized partitions. We experimentally show that our research prototype HYRISE can perform online reorganization of hybrid main memory databases with a negligible overhead, leading up to three orders of magnitude performance gains when determining the optimal layout of dynamic workloads and providing guarantees on the worst case performance of our system.

It is an object of the present invention to further improve operation and performance of databases.

This object is solved by the present invention by providing a computer-implemented method according to the independent claim 1 and the claims depending on claim 1 as well as a corresponding computer system according to claim 11 and a non-transitory computer readable medium according to claim 12 for use on a computer system containing computer-executable programming instructions for executing, on the computer system, a corresponding method.

In one embodiment of the computer-implemented online reorganization method, a database layout of a database containing tables is dynamically adapted. The tables of the database are vertically partitioned into containers, each container containing one or more attributes of one table. According to the embodiment, a workload on a set of tables of the database is analyzed by a workload analysis tool of a computer system. The workload on the set of tables comprises queries that may be executed by a query processor of the computer system. Further, a workload change of the workload is detected by the workload analysis tool of the computer system. A workload evaluation tool of the computer system analyses, if a new layout for the set of tables is considered optimal in view of the workload change, and decides, whether the layout of the set of tables is switched to the new layout.

In another embodiment of the computer-implemented online reorganization method, the workload analysis tool determines a difference query indicative of the difference between a new workload and a previous workload.

In another embodiment of the computer-implemented online reorganization method, the workload evaluation tool determines a set of containers consisting of all containers of the set of tables that are accessed by the difference query, a set of queries consisting of all queries of the previous workload that access any container of the set of containers, a set of attributes consisting of all attributes of the set of containers that are accessed by any query of the set of queries, and an optimal layout for the set of attributes.

In another embodiment of the computer-implemented online reorganization method, the workload evaluation tool determines a set of primary partitions consisting of all primary partitions for the set of tables and the workload costs of the new workload for every candidate partition of a first set of candidate partitions, the first set of candidate partitions consisting of all partitions obtained by merging two or more primary partitions of the set of primary partitions. Further a candidate partition is discarded from the first set of candidate partitions if the workload costs of the candidate partition is equal to or greater than the sum of the individual workload costs of the primary partitions forming the candidate partition, resulting in a second set of candidate partitions. The workload costs of the new workload for all possible layouts obtained by combining candidate partitions from the second set of candidate partitions are then determined.

In another embodiment of the computer-implemented online reorganization method, the workload evaluation tool determines the workload costs of the current layout, the workload costs of the layout that is considered optimal in view of the workload change, and the penalty costs as the difference between the workload costs of the current layout and the workload costs of the layout that is considered optimal in view of the workload change. Further, the transition costs for changing the current layout to the layout that is considered optimal in view of the workload change are determined. Weighted penalty costs are determined by multiplying the penalty costs with a weight factor and new accumulated penalty costs are determined by adding the weighted penalty costs to previously accumulated penalty cost. If the new accumulated penalty costs are larger than the transition costs, the switching of the layout of the set of tables from the current layout to the layout that is considered optimal in view of the workload change is triggered.

In another embodiment of the computer-implemented online reorganization method, the workload evaluation tool determines the workload costs of the current layout repeatedly, wherein the time interval between one determination of workload cost and the next determination of workload costs defines an epoch.

In another embodiment of the computer-implemented online reorganization method, the previously accumulated penalty costs are reset if the layout that is considered optimal in view of the workload change in the present epoch is different from the layout that was considered optimal in view of the workload change in the previous epoch.

In another embodiment of the computer-implemented online reorganization method, the weight factor may be increased in each epoch.

In another embodiment of the computer-implemented online reorganization method, the number of epochs in which each layout was considered optimal is stored. When a new layout is considered optimal in view of the workload change, the stored value of number of epochs in which the new layout was considered optimal is used as weight factor.

In another embodiment of the computer-implemented online reorganization method, statistical information about the executed queries for each workload is stored.

In an embodiment of the computer system for dynamically adapting a database layout of a database stored on the computer system, the database contains tables, wherein the tables are vertically partitioned into containers, each container containing one or more attributes of one table. The computer system comprises a workload analysis tool configured to analyze a workload on a set of tables of the database, the workload comprising queries and to detect a workload change of the workload. The computer system further comprises a workload evaluation tool configured to analyze if a new layout for the set of tables is considered optimal in view of the workload change and to decide whether the layout of the set of tables is switched to the new layout.

In an embodiment of the non-transitory computer readable medium for use on a computer system, the non-transitory computer readable medium contains computer-executable programming instructions for performing, when executed on the computer system the computer-implemented database online reorganization methods for dynamically adapting a database layout of a database described above.

The following detailed description and accompanying drawings provide a better understanding of the nature and advantages of the present invention.

DETAILED DESCRIPTION

Described herein are techniques for online reorganizing a database, i.e., for dynamically adapting a database layout of a database. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalent of the features and concepts described herein.

3. ARCHITECTURE

Based on the motivation presented in the introduction, we present HYRISE [M. Grund, J. Krüger, H. Plattner, A. Zeier, P. Cudré-Mauroux, and S. Madden. HYRISE—A Main Memory Hybrid Storage Engine. PVLDB, 4(2):105-116, 2010]. HYRISE is an in-memory, compressed, vertically partitionable database engine. It is designed to support the update rate required by mixed workloads and to provide the high read performance of column stores.

3.1 HYRISE Architecture

Figure 1:
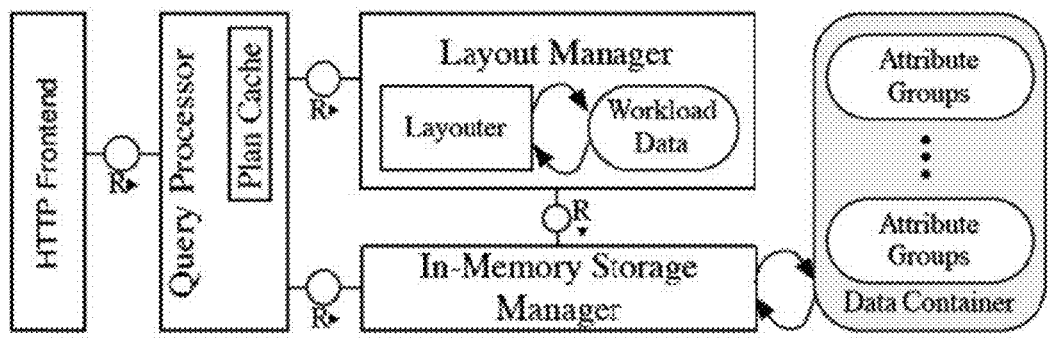
FIG. 1 shows the HYRISE architecture.

The following section describes the architecture of HYRISE. The main architectural components are shown in FIG. 1. The storage manager is responsible for creating and maintaining the data containers storing the actual data. The query processor receives user queries, creates a physical query plan for each query, and executes the query plan by calling the storage manager. The layout manager analyzes a given query workload and suggests the best possible layout (partitioning) for this workload to the storage manager. Information about the query execution e.g. plan cache and statistics are maintained in the query processor, as it serves as the system's front end.

We have built a academic database prototype of this architecture. Our prototype executes hand-coded query plans encoded in JSON which are received using the HTTP frontend of HYRISE and then executed in the query processor. Modifying transactions are currently serialized using a second write queue to each partition. Recovery is partially achieved using the merge process to persist a binary image of the tables that can be loaded later on. Sockut and Iyer [G. H. Sockut and B. R. Iyer. Online reorganization of databases. ACM Comput. Surv., 41(3), 2009] state that the copy that is created during the reorganization can be used as the basis for recovery. However, these features are orthogonal to the layout problem and not discussed in detail here.

HYRISE supports a fine-grained hybrid storage model, which stores a single relation as a collection of disjoint vertical partitions of different widths. Each partition is represented by a data structure we call a container. Each attribute is mapped to one and only one container. A container provides methods to access the various values it holds. Containers are physically stored as a list of large contiguous blocks of memory. Data types are dictionary-compressed into fixed-length fields to allow direct access (offsetting) to any given position. The dictionary is stored as an ordered collection of values allowing fast iterations over the tuples in sorted order. Additionally, the search operation can be implemented as binary search that has logarithmic complexity. As a result, most queries can be executed with a binary search (random access) in the dictionary while scanning the column (sequential access) for the encoded value only.

Position offsets typically come from another container or from a value-index lookup following the principles of late materialization during query execution.

The layout manager in HYRISE is a front-end accessible component that can be called as any other plan operation. The output of the layout plan operation can then be used as input for the layout modification, which can in turn be called as a normal query plan operation.

Compression in HYRISE comes at a price: updates might change encoded values and require a rewrite of the complete partition. Consequently, direct updates in the main partition would be unacceptably slow. In order to minimize the overhead of maintaining the sort order, incoming updates are accumulated in the write-optimized delta partition as described in [M. Stonebraker, D. J. Abadi, A. Batkin, X. Chen, M. Cherniack, M. Ferreira, E. Lau, A. Lin, S. Madden, E. J. O'Neil, P. E. O'Neil, A. Rasin, N. Tran, and S. B. Zdonik. C-Store: A Column-oriented DBMS. In VLDB, pages 553-564. ACM, 2005]. In contrast to the main partition, data in the write-optimized delta partition is not compressed.

To keep track of the workload we introduce a statistics component. To identify a single plan we hash the internal representation of the complete plan operation and store one entry per plan operation and table in our statistic table. To ensure the best performance, this statistic data is not directly written to a summary table, but is regularly moved from the thread specific storage of each execution thread into the global summary table. In the unlikely event of a system crash this would only result in the loss of the last batch of updates to the query statistics and would not mean losing the complete statistics. However, the advantage is that if multiple queries are executed on multiple processors and even if the plan is distributed over multiple cores the execution threads will not compete to store the statistic information. A similar approach is described in [N. Bruno. Automated physical database design and tuning. Emerging Directions in Database Systems and Applications. Taylor and Francis, 2011, 117 pp] where Bruno proposes to use the query plan cache for workload gathering relying on an instrumented version of the query plan as described in [N. Bruno and S. Chaudhuri. To Tune or not to Tune? A Lightweight Physical Design Alerter. In VLDB, pages 499-510. ACM, 2006].

3.2 Merge Process

To update the data from the write-optimized buffer into the main compressed storage HYRISE executes a periodic merge process. This process combines all data from the main partition as well as the delta partition to create a new main partition that then serves as the primary data store.

The merge process can be triggered either by the user through executing a special plan operation or directly by the layout manager on a per table basis.

Figure 2:
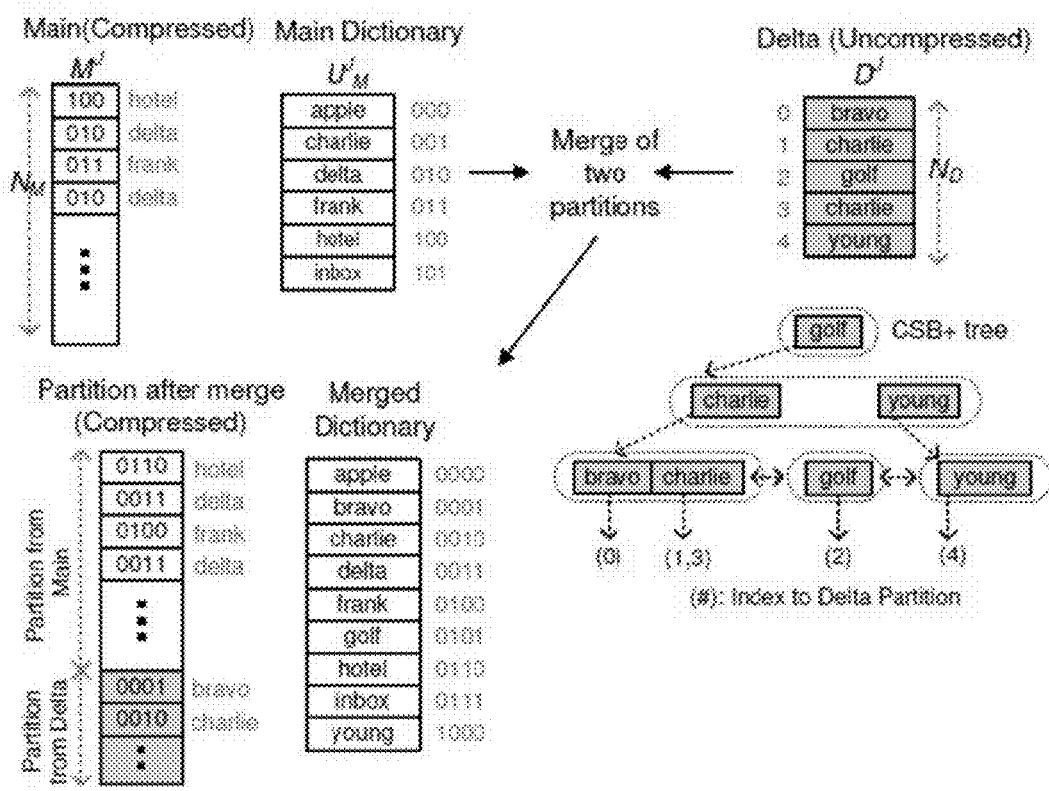
FIG. 2 shows an example of the merge process.

FIG. 2 gives an example of how the merge process works. Even though the figure describes only the merge of a single column, the merge is always triggered for a table.

The compressed main partition contains only encoded values referencing a value from the sorted main dictionary. The delta partition stores uncompressed values. The merge process is now executed in two steps: The first step will unify the dictionaries from both delta and main partition. Unifying the dictionaries consists of creating a list of distinct values for the delta partition and merging this list with the sorted dictionary from the compressed main partition. In the second step encoded values from the old compressed main store are re-coded with the encoded ids of the new dictionary and all new values from the delta partition are appended to the main store following a strict insert-only approach. In [J. Krüger, C. Kim, M. Grund, N. Satish, D. Schwalb, J. Chhugani, H. Plattner, P. Dubey, and A. Zeier. Fast Updates on Read-Optimized Databases Using Multi-Core CPUs. PVLDB, 5(1):61-72, 2011] Krueger et al. present how this process can be efficiently parallelized and how it scales with the number of available CPU cores for the merge process and provides more details on the implementation and optimization of the merge process.

To achieve transactional safety, all newly incoming modifications to this table are re-routed to a second delta partition that is created as soon as the merge starts. During the merge process a copy of the data is built in memory and when the merge finishes the old main and delta partitions are discarded making the new merged partition the active one. During the merge all queries must query the old main partition—and both delta buffers—to fetch all results.

4. INCREMENTAL LAYOUTING

This section describes the process we use to perform an online reorganization in our hybrid in-memory storage engine. Since a naive implementation for finding the optimal layout would not be able to complete the calculation process in a timely manner, HYRISE provides an incremental layout process that is able to determine the optimal layout even for large enterprise databases and constantly evolving workloads. Table 2 gives the symbol definitions used throughout this paper.

TABLE 2

Symbol Definitions

| Symbol | Description |
|---|---|
| T | A table in the database |
| $T_{\lambda i}$ | A table with the layout $\lambda_i$ |
| $a_i$ | An attribute of a table T |
| $C_i$ | A container containing one or multiple attributes |
| $P_i$ | Intermediate layouts containing only attributes that do not incur overhead cost when accessed |
| $\lambda_T$ | A valid layout for the table T |
| $t_n$ | System epoch |
| $W_t$ | Captured workload at epoch t |
| $Q_i$ | A query part of workload W |
| Cost(T, W) bytes | The cost of the workload W for the table T |
| CostMerge(T) bytes | The cost of merging the delta buffer of T into the main partition |
| TC(t, $\lambda_i$, $\lambda_j$) bytes | The cost of changing the layout of a table T from $\lambda_i$ to $\lambda_j$ |

4.1 Existing Approach

The offline process to determine the optimal physical layout for a given table consists of the three steps mainly, as described in [M. Grund, J. Krüger, H. Plattner, A. Zeier, P. Cudré-Mauroux, and S. Madden. HYRISE—A Main Memory Hybrid Storage Engine. PVLDB, 4(2):105-116, 2010]. The input for this process is a workload sequence W containing an arbitrary set of queries Q. Each query is identified by the attributes it accesses during its operations and the selectivity of the query. The output of the layout process is a layout $\lambda_T$ containing a set of containers C, each storing a set of attributes $\{a_i, \ldots, a_j\}$. The containers define a partition over the attributes (in the sense that each attribute is contained in exactly one container.)

Candidate Generation.

The first phase of the layout process determines all primary partitions for all participating tables. A primary partition is defined as the largest partition that does not incur any container overhead cost OC. For each relation R, we start with the complete set of attributes $\{a_i, \ldots, a_m\}$ in R. Each operation $op_i$ implicitly splits this set of attributes into two subsets: the attributes that are accessed by the operation and those that are ignored. The order in which we consider the operations does not matter in this context. By recursively splitting each set of attributes into subsets for each operation $op_j$, we end up with a set of |P| primary partitions $\{P_1^1, \ldots, P_{|P|}^1\}$, each containing a set of attributes that are always accessed together. The cost of accessing a primary partition is independent of the order in which the attributes are laid out, since all attributes are always queried together in a primary partition (OC=0).

Candidate Merging.

The second phase of the layout process inspects permutations of primary partitions to generate additional candidate partitions that may ultimately reduce the overall cost of the workload. Our cost model shows that merging two primary partitions $P_i^1$ and $P_j^1$ is advantageous for wide, random access to attributes since corresponding tuple fragments are co-located inside the same partition; for projections, the merge process is usually detrimental due to the additional access overhead (which occurs unless both primary partitions are perfectly aligned to cache lines.) This tension between reduced cost of random accesses and penalties for large scans of a few columns allows us to prune many of the potential candidate partitions. We compute the cost of the workload W, $Cost_{Pin}(W)$ on every candidate partition obtained by merging n primary partitions $(P_1^1, \ldots, P_n^1)$, for n varying from 2 to $|P|$. If this cost is equal to or greater than the sum of the individual costs of the partitions (due to the container overhead), then this candidate partition can be discarded.

Layout Generation.

The third and last part of our layout process generates the set of all valid layouts by exhaustively exploring all possible combinations of the partitions returned by the second phase. The process evaluates the cost of each valid layout consisting of a covering but non-overlapping set of partitions, discarding all but the physical layout yielding the lowest cost.

4.2 Incremental Candidate-Based Reorganization

The candidate-based layout process described above is applied on the whole schema and takes the whole workload as input. Thus, a complete recomputation of the layout has to be performed whenever the workload changes. In most cases, however, we expect the workload to change only gradually over time, or to exhibit some periodic behavior.

In that case it is not desirable to re-evaluate the complete workload to determine the optimal workload, but rather to allow calculating the optimal layout in an incremental way.

We describe below a new process that can be used to efficiently and incrementally compute the new optimal layout of the main-memory database when the workload is evolving. In our HYRISE prototype, the incremental layout process is only triggered if the cost for executing the workload on the current layout reached a certain threshold to avoid too frequent recalculations for only small changes (see Section 5 for more details). The new incremental process is based on three main ideas: partial layout recomputation, candidate pruning, and layout subsumption.

4.2.1 Layout Cycle

The starting point of the incremental process is a workload $W^t$, the corresponding optimal layout (as determined by the process given above and yielding the lowest cost for the workload) $\lambda^t_{opt}$—both taken at a certain point in time t—and a new workload $W^{t+1}$ taken at a subsequent point in time t+1.

The difference between $W^{t+1}$ and $W^t$ may be caused by a number of different changes to the workload: the introduction of a new query or set of new queries, the removal of some queries, or the modification of some of the parameters (frequency, selectivity, or set of attributes) of the queries. The identification of new, modified, or dropped queries is performed by the statistics component. We define one generic operation with which we can handle all those different cases. We consider a new query $Q_\epsilon$, representing the difference between the workload taken at two consecutive point in time. $Q_\epsilon$ can represent several operations, including Query Reweighing: When the weight (i.e., popularity) of a query $Q_i$ in the workload changes, then $Q_\epsilon$ corresponds to that query and has as a weight the difference between the new and the old weight.

Query Appearance: If a new query $Q_i$, not present at time t, appears at epoch t+1, $Q_\epsilon$ simply represents that query.

Query Removal: If a query $Q_i$ present at epoch t, disappears from the workload at epoch t+1, $Q_\epsilon$ represents that query and has a negative weight.

Using this simple model, all changes in the workload are modeled by considering series of $Q_\epsilon$ operations between two points in time.

We define the process of finding the new optimal layout incrementally as a layout cycle. A layout cycle has a set of pre- and postconditions that must always be met. The precondition for a layout cycle is the availability of the current optimal layout $\lambda^t$ along with statistics about the current workload $W^t$. The input of the layout cycle is a series of modifications modeled by a series of $Q_\epsilon$ queries. The postcondition of the layout cycle is a new set of queries and weights, and a potentially new optimal layout for this workload. For reasons of simplicity, we restrict the processes to a single $Q_\epsilon$ in the following; however, the process works identically with series of $Q_\epsilon$ treated in sequence.

4.2.2 Partial Layout Recomputation

We start by assessing the impact of the new query on the current set of containers. The first task is to match all attributes of the new query ($Q_\epsilon$) against the containers of the current layout $\lambda^t$, yielding all containers that are accessed by the query. Since the cost of all containers can be computed independently (see [M. Grund, J. Krüger, H. Plattner, A. Zeier, P. Cudré-Mauroux, and S. Madden. HYRISE—A Main Memory Hybrid Storage Engine. PVLDB, 4(2):105-116, 2010]), the query has no effect on the other containers, whose cost remain constant.

For the rest of the process, it is thus sufficient to consider those accessed containers only. The next step identifies all the queries from the original workload that access the containers considered. As the new query will typically not access all attributes, this will often greatly reduce the number of attributes and queries to examine.

The partial layout recomputation step creates thus a new schema—or more precisely a sub-schema that will be used by the rest of the incremental process. This new schema is composed of all the attributes contained in the containers considered. The sub-schema can be layouted as any other schema, and is the input of the subsequent incremental lay-outing steps described below.

The result of the layout generation is a new layout for the sub-schema. Together with the untouched containers from the original layout, this generates the new optimal layout. The advantage of considering this sub-layout is that the number of attributes and queries consider is typically rather small, allowing a high-performance computation of the optimal layout.

4.2.3 Candidate Pruning

During the partial layout recomputation step we identify all queries that access the same containers accessed by the new query $Q_\epsilon$. Since we first compute the sub-layout for the accessed containers, we can prune combinations of such containers that are accessed by those queries, but not accessed by $Q_\epsilon$. This is true for two reasons:

1. The cost of a query is the sum of the access cost of each container it accesses.
2. The cost functions we use to compute the number of cache misses for the different access types in [M. Grund, J. Krüger, H. Plattner, A. Zeier, P. Cudré-Mauroux, and S. Madden. HYRISE—A Main Memory Hybrid Storage Engine. PVLDB, 4(2):105-116, 2010] are monotonically increasing with the width of the container.

We can prove this assumption easily by contradiction. Given a query $Q_i$ that accesses containers $C_0$ and $C_1$ of a table, if $Q_\epsilon$ accesses $C_1$ and $C_2$ of this table, we need to differentiate two cases: In the first case $Q_\epsilon$ will not change the partitioning of the table and thus $C_1$ and $C_2$ will remain unchanged and the cost for $Q_i$ will not change. In the second case adding $Q_\epsilon$ will potentially lead to a new merged partition container $C_{1,2}$. If we would need to consider merging $C_0$, $C_1$, and $C_2$ the following must be true, because for the original layout it was considered optimal to create the partition $C_0$:

$$\text{Cost}(Q_i,C_0)+\text{Cost}(Q_i,C_1)>\text{Cost}(Q_i,C_0)+\text{Cost}(Q_i,C_{1,2}) \quad (1)$$

However this inequality cannot hold because of rules 1 and 2 above. As an example for the second rule, let us consider computing the cost for performing a projection on a given container where the distance between two projected tuples is smaller than a cache line:

$$Miss_i(C, \pi) = \left\lceil \frac{C \cdot w \times C \cdot n + C \cdot 0}{L_i \cdot w} \right\rceil \quad (2)$$

In Equation (1) $\text{Cost}(Q_i,C_0)$ are constant and can be omitted. Now when we look at $C_1$ and $C_{1,2}$, the following condition is true: $C_1 \cdot w < C_{1,2} \cdot w$. Consequently, $$\text{Cost}(Q_1,C_1) \not> \text{Cost}(Q_i,C_{1,2}) \quad (3)$$

proves that we can prune those candidates early in the sub-layout step. This can be generalized to all equations computing the number of cache misses, since the width of the container always has the same impact (see [M. Grund, J. Krüger, H. Plattner, A. Zeier, P. Cudré-Mauroux, and S. Madden. HYRISE—A Main Memory Hybrid Storage Engine. PVLDB, 4(2):105-116, 2010]).

4.2.4 Incremental Layout Generation

We then generate the layouts by combining the various candidate containers as described above. However, during this phase as well, we can prune out many candidate layouts if we keep some minimal information about past layouts. For this, we store the top-k layouts $\lambda_k$, along with their respective costs $C(\lambda_k)$, in addition to the best layout $\lambda_{opt}$ when generating valid layouts at time t.

At time t+1, our process starts by determining the cost of the optimal layout from time t taking into account the new query ($\text{Cost}(Q_\epsilon)$):

$$\text{Cost}_{\lambda_{opt}}(W^{t+1})=\text{Cost}_{\lambda_{opt}}(W^t)+\text{Cost}_{\lambda_{opt}}(Q_\epsilon).$$

We now suppose that the incremental process examines a new layout $\lambda$ during the layout generation part. If this layout $\lambda$ is equivalent to one of the top-k layouts from time t, then our incremental process can immediately determine its cost by simply computing:

$$\text{Cost}_\lambda(W^{t+1})=\text{Cost}_{\lambda_k}(W^t)+\text{Cost}_\lambda(Q_\epsilon)$$

since the cost distributes over the queries.

Also, the layout can safely be discarded whenever $$\text{Cost}_\lambda(Q_\epsilon)>\text{Cost}_{\lambda_{opt}}(W^{t+1})-\text{Cost}_\lambda(W^t)$$

since the cost of this layout is then greater than the updated cost of the previous optimal layout.

The complete incremental layout process is given in Process 1.

---
Process 1: Incremental Layout Generation
---

1: procedure INCREMENTALLAYOUT(newQuery)
2:   for all container ∈ $\lambda_{current}$ do
3:     for all attribute ∈ newQuery.attrs do ---
Process 1: Incremental Layout Generation
---

4:       if attribute ∈ container then
5:         aContainers ← container
6:         found ← True
7:       end if
8:     end for
9:     if found then
10:       break
11:     else
12:       naContainers ← container
13:     end if
14:   end for
15:   for all q ∈ queries do
16:     for all c ∈ aContainers do
17:       if accesses(c,q) then
18:         aQueries ← q
19:       end if
20:     end for
21:   end for
22:   accessedQueries ← newQuery
23:   modifiedSchema ← [aContainers, aQueries]
24:   /* Call the original process with the modified schema */
25:   $\lambda_{new}$ ← candidate_layout(modifiedSchema)
26:   merge($\lambda_{new}$, naContainers)
27:   return $\lambda_{new}$
28: end procedure

4.2.5 Example

Figure 3:
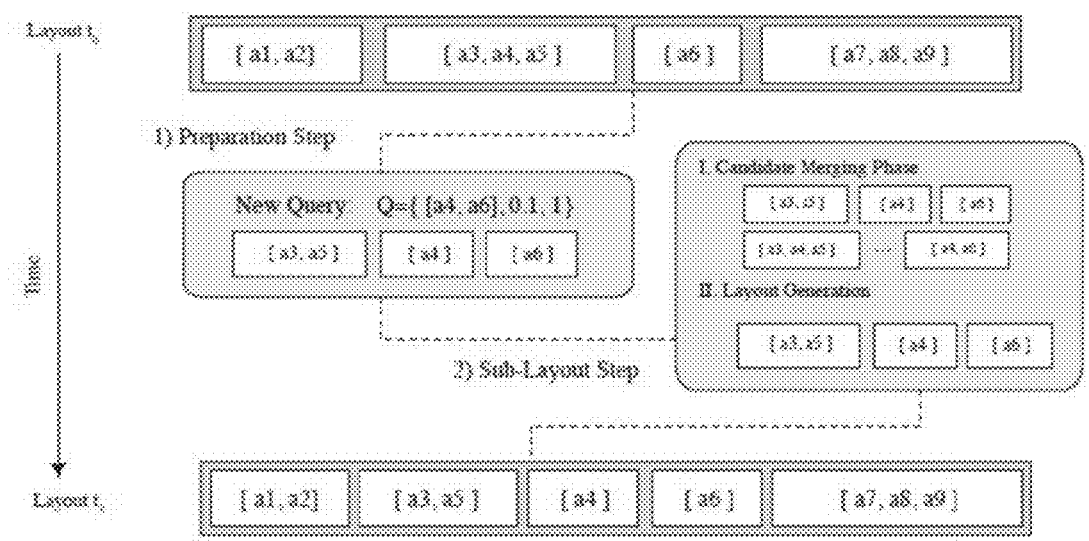
FIG. 3 shows an example for incremental layout, starting from t0 to t1. Adding a new query and thus modifying the layout.

FIG. 3 shows an example of the incremental layout generation process. The initial layout at $t_0$ is shown at the top of the figure and shows four containers with different numbers of attributes. From epoch $t_0$ to $t_1$ we add a new query to the workload resulting in a necessary recalculation of the layout. The first step of the incremental layout process is now to detect which containers are affected by this query. In this case these are the containers containing the attributes $[a_3,a_4,a_5]$ and $[a_6]$. For simplicity we assume no additional queries have to be taken into account for the new layout. In the preparation step the two containers are now separated into primary partitions $[a_3,a_5]$, $[a_4]$, and $[a_6]$. The primary partitions and the affected queries of the workload (in this simplified case only Q) are used as the input for the sub-layout step following the original layout process presented earlier. If we would consider additional queries in this example, those queries would need to be considered for the split of the affected containers into primary partitions and also during the sub-layout step. In the sub-layout step the primary partitions are permuted and checked for suitable partition merges that then are added as candidates when they cannot be pruned. Based on the generated candidates, the process then iterates over all valid layouts (and prunes some layouts by doing so using the top-k technique described above). Finally, it returns as a result the layout yielding the lowest cost. The output of the sub-layout step is now merged with the unaffected attribute containers from the first step. The result of the sub-layout merged together with the previous containers now represents the current optimal layout for the modified workload.

In this example our workload consists of 4 initial queries yielding the layout as presented in FIG. 3 at the top. When we modify the workload with the addition of query Q we measured the execution cost for the recomputation of the complete layout. Using the offline approach, the computation takes 9,921,732 CPU cycles, while using the incremental process the cost to calculate the new layout based on the changed workload only takes 462,851 CPU cycles, a 20× performance improvement. As a consequence, our extended incremental layout process is efficient enough to allow determining new layouts for tables at system run-time.

4.3 Merge with Layout Modification

As described in Section 3.2 the implementation of our merge process is designed to efficiently apply accumulated updates to the compressed main partition of a table. Furthermore the implementation only considers a fully decomposed table layout. As stated in Section 3.2, the merge implementation is divided into two major steps: the dictionary merge and the update value phase. The change of the layout has no affect on the first phase, but affects the second one. Since the merge could be performed after the new optimal layout is computed, we adjusted our process to be able to write the updated encoded values into an arbitrary output layout.

In addition to the input parameter, the order in which the individual sub-steps of the merge process are executed have to be changed. For each container of the output layout, all dictionaries are identified and merged with their uncompressed counterparts from the delta buffer. Based on the sizes of the new dictionaries we can compute the width of the container if bit compression is applied. The width of an individual attribute can be calculated from the number of its distinct values. The width of the compressed container is then simply the sum of the number of bits required to store the encoded values for each of the attributes.

5. WORKLOAD CHANGE

In this section we describe new techniques to handle potential layout changes. Since modifying the physical layout of the database is a costly operation, we need to take extra precaution while calculating merge cost and identifying the best point in time to perform the switch from the old layout to the new layout.

The general idea is to schedule the re-evaluation of the workload based on a fixed time interval which we call an epoch. Every time the process is triggered, it re-evaluates the layout of all tables and additionally detects if tables need to be merged, or if it would be beneficial to switch to a new, optimal layout immediately or to wait for some time.

5.1 Change Detection

Figure 4:
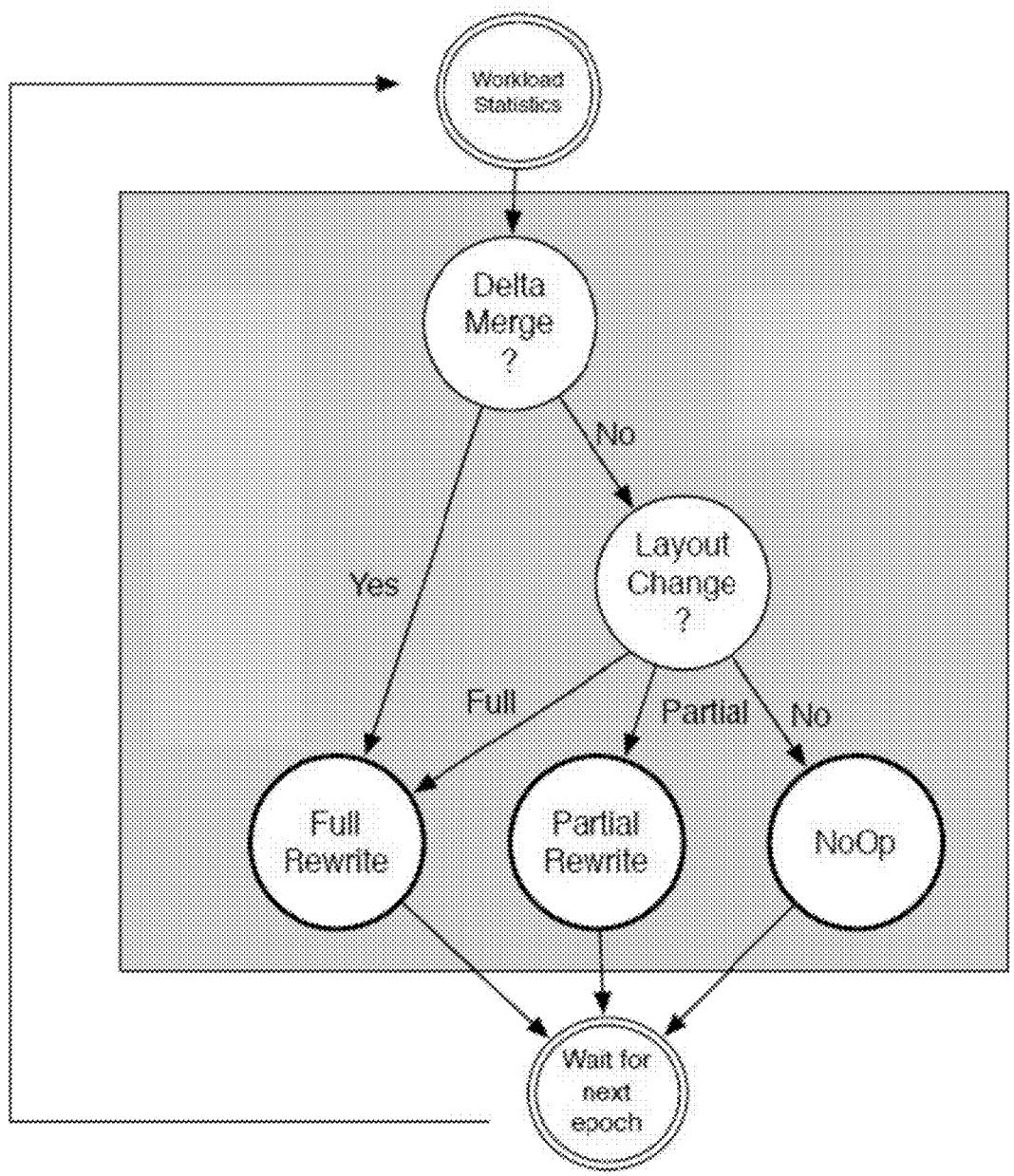
FIG. 4 shows a decision tree allowing to perform the required data structure modification.

Since the cost for a transition between two layouts can be high, it is essential to determine the extent to which this cost can be amortized for future queries and to decide on the most opportunistic moment to make the transition. The corresponding decision making process is illustrated in FIG. 4. The input for the process is the statistical information about the executed queries in the system. This captures all information on a per-relation basis. Table 2 explains the symbols used in this section.

The process illustrated in FIG. 4 is executed per table, since it is possible to calculate the optimal layout for each table individually (as shown in [M. Grund, J. Krüger, H. Plattner, A. Zeier, P. Cudré-Mauroux, and S. Madden. HYRISE—A Main Memory Hybrid Storage Engine. PVLDB, 4(2):105-116, 2010]) and since delta partitions are defined on a per-table basis.

The first step in the decision process (FIG. 4) is to identify if the size of the delta partition is large enough to be merged into the main partition. This can be performed by estimating the cost of running the workload for a re-compressed main partition plus the cost for the merge (amortized cost), and comparing this to the cost of the workload without the merge process. If the amortized costs are smaller than the original cost:

$$\mathrm{Cost}(W,T)+\mathrm{MergeCost}(T) \ll \mathrm{Cost}(W,T) \qquad (4)$$

the table needs to be merged. The cost of for the merge process is based on the generated memory traffic as presented in [J. Krüger, C. Kim, M. Grund, N. Satish, D. Schwalb, J. Chhugani, H. Plattner, P. Dubey, and A. Zeier. Fast Updates on Read-Optimized Databases Using Multi-Core CPUs. PVLDB, 5(1):61-72, 2011].

If the delta partition is small, it is then often not worthwhile to perform the merge (No Merge in FIG. 4) and we proceed to the next step. If a merge is required, we proceed to the next step also but can set the layout transition cost (written TC in the following) to zero, since this penalty is handled by the merge process. As shown in our evaluation (Section 6.3), the merge cost is independent of the layout chosen.

In the subsequent step, the process evaluates if a new layout is more suitable than the current one for the current workload. The optimal layout is determined efficiently using the incremental process explained in Section 4.2.

If the incremental process identifies a new optimal layout for the current workload, we have to identify whether the potential transition cost incurred by switching to the new layout can be amortized given our current knowledge of the workload. Therefore, we try to predict if the expected performance gains cover the transition cost. If this is not the case, the layout change will be deferred until the workload is re-evaluated. In case a delta merge has to be performed, we can systematically perform the layout change without further checks (since the table needs to be fully rewritten anyway).

A special case arises when the old layout and the new layout are partially the same, and thus only some parts of the table need to be re-organized. In that case the transition costs are computed based on the fraction of the attributes touched by the re-organization. This holds true since during the merge process every attribute is treated independently.

Equation (5) defines the transition cost to adopt a new layout for a table T for the different cases (if merge, full change, partial change):

$$TC(T_{\lambda_k}, W) = \begin{cases} 0 \\ \mathrm{CostMerge}(T, W) \\ 2\sum_{j}^{A_{\lambda_k}} \dfrac{E_C^j N_M}{8} \end{cases} \qquad (5)$$

In case of a partial layout change, the structure of the write-optimized delta buffer remains the same while only a fraction of attributes of the compressed main store are modified and the transition costs depend on the size of the attributes to change. The total memory traffic required to perform the write operation equals twice the size of the fraction of the compressed table since it has to be read and written once.

If no new layout is adopted, the system continues with its default behavior, resulting in a merge of the table if the delta buffer is large enough or a no-op otherwise. At the end of the process, the decision process enters a wait state until the end of the current epoch and the evaluation process is started again.

To summarize, based on the previously described change detection process, we differentiate the following cases:

Merge w/o Layout Change: Requires a full merge operation, incurs no additional cost.

Merge w/Layout Change: Requires a full merge operation, cost of layout change only dependent of the merge, no additional cost.

no Merge/Layout Change: Layout change required, cost of change dependent on the size of the table.

no Merge/Partial Layout Change: Change of a subset of the attributes, no merge required, cost only dependent on the amount of data moved.

Since the merge will always prioritize any change in the layout based on the input workload, the interesting cases are the last two since the cost for the layout change have to be explicitly calculated and compared to the expected gain with a layout change.

5.2 Layout Amortization

One important aspect of the change detection is to calculate when a new layout will be adopted. There are two major factors that influence this decision. On the one hand are the transition costs for the new layout and on the other hand are the penalty costs that are incurred when keeping a sub-optimal layout. For the remainder of this section we always measure workload costs, transition costs and penalties in cache misses.

To illustrate the above scenario, we describe the following example. At epoch $t_0$ the layout $\lambda_i$ is optimal; in the next epoch $t_1$ a new layout $\lambda_k$ is optimal resulting in 10% lower cost for the complete workload $-C(W, \lambda_i)=1100, C(W, \lambda_k)=1000$. The transition costs TC for changing the layout from $\lambda_i$ to $\lambda_k$ are 1000. If we would apply the new layout immediately the workload costs for the next epoch would be 2000, 1000 are the costs for the workload plus the transition costs. This naive approach allows for fast adaption of new layouts but has the significant drawback that if the layout changes again in $t_3$ transition costs are high and cannot be amortized.

The second approach is to keep $\lambda_i$ as the current layout until TC are amortized. If now the layout changes in $t_3$ the penalty is only a fraction of the transition costs compared to the previous example. The layout $\lambda_k$ will be adopted at $t_{11}$ resulting in a total overhead of 1000 if the layout does not change in between.

As we can see there is a strong tension between both strategies. Our goal in the following is to define a strategy that allows combining both scenarios while avoiding too frequent layout changes on the one hand and workload penalties on the other hand.

In HYRISE, we achieve this by increasing the importance of switching the layout over time gradually by incrementally weighting the number of epochs the current layout is regarded as optimal for the current workload.

First, we determine the optimal layout for each epoch t based on the workload and calculate the delta costs between the current workload cost and the workload cost with the new layout. If the delta costs are larger than $\phi$ we consider this layout as the new optimal one. As a second step we determine the epoch weight. The epoch weight is an incremental multiplier that is used in conjunction with the delta costs of the workload cost. Furthermore, with each step the layout is calculated as the optimal layout, we increase the multiplier by one. For each epoch, we save this information in a buffer and trigger the transition to the new optimal layout, if the accumulated cost gets larger than the transition costs.

In case the workload changes and a new optimal layout is detected before the accumulated transition cost reaches the required threshold, we reset this buffer.

While this process is able to avoid unnecessary layout transitions, it is not optimally suited for recurring workloads. In [S. Agrawal, E. Chu, and V. R. Narasayya. Automatic physical design tuning: workload as a sequence. In *Proceedings of the ACM SIGMOD*, pages 683-694. ACM, 2006] Agrawal et al. state that one of the reasons for online reorganization is recurring workload changes that have their origins in day/night scenarios, where during the day the system is used in a transactional way, while at night different analytical queries are run. To support recurring frequent workloads, we add the notion of layout history to our weight-based change detection process. During each workload cycle, the system keeps track of the number of epochs during which a given layout was optimal. When the system switches its layout back to an already known one, we use this value as the initial parameter of the epoch weight. If the workload cycle switches to a different layout, the system updates this value with the current number of epochs the layout was regarded as optimal.

Figure 5:
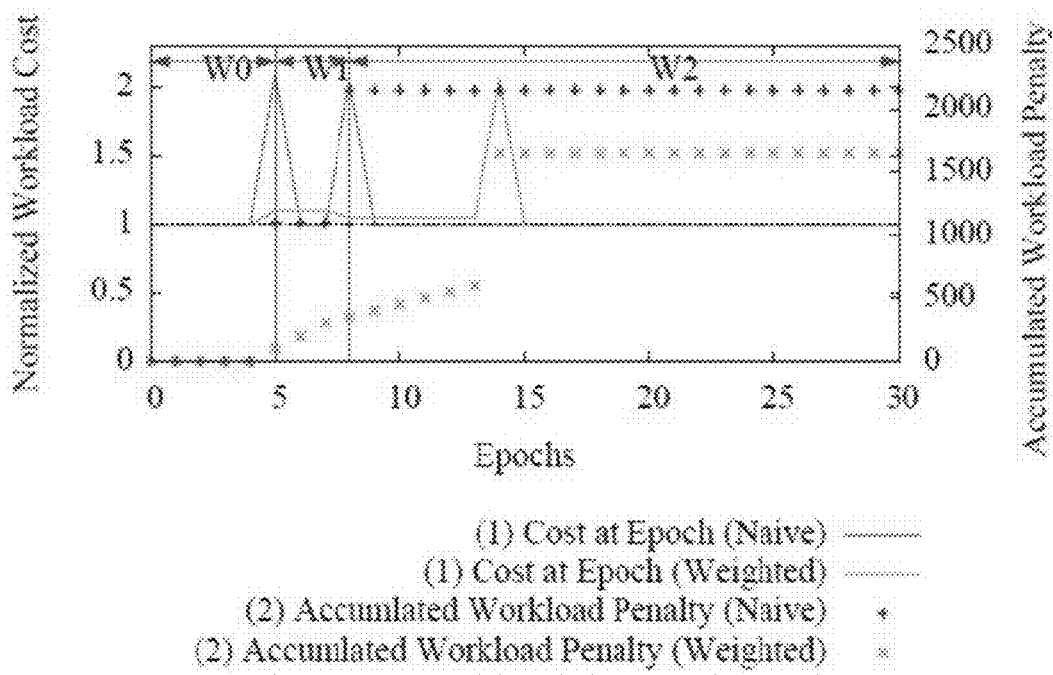
FIG. 5 shows layout adaption in an example.

FIG. 5 shows an example of this adaption process and compares it to the naive version that will always switch layouts as soon as the workload changes. The derivation of the workload cost for W1 is 10% and for W2 it is 5%. The transition costs are 100% of the workload cost.

The x-axis shows the number of epochs. At each epoch the cost for the normalized workload cost for the current layout are plotted on the first y axis. At epoch 5 the workload changes resulting in higher normalized workload costs (1 being optimal); then the process of accumulating the workload penalty starts. However, at epoch 8 the workload changes again. Then, the accumulated workload penalty is reset. Using the epoch weight, the layout adaption is executed at epoch 14, resulting in a peak of the normalized workload cost since now the transition costs need to be included. The dots of the other series show the accumulated workload penalty costs for the time when the current layout is not optimal with regards to the current workload.

5.3 Putting it all Together

Based on the different processes that we described above, the complete online reorganization process looks like as follows: At every fixed epoch the workload analysis tool is run to detect if the workload changed. This information is handed over to the workload evaluation process that then analyzes if a new layout is considered optimal and starts with the evaluation of the time it would take for the new layout to get amortized. When the layout amortization process decides to switch to a new layout, the merge process is triggered. Since the merge process works in the background, the system remains operational and all incoming queries can be executed. Modification will be inserted into the second delta buffer and all read queries can be answered from the main and the two delta partitions. When the merge is finished the old table is discarded and the new table with the new layout becomes active.

6. EVALUATION

In this section we present a detailed analysis of our incremental layout process compared to our original implementation. Furthermore we analyze the properties of the process when the workload changes over time. All tests were performed on a Ubuntu Linux server with a 3.0.0 kernel, gcc 4.5.2. The CPU is a 4 way 8 core Intel Xeon™ X7560 running at 2.27 GHz with 256 GB of main memory.

6.1 Performance Motivation

The enterprise applications we observed in [M. Grund, J. Krüger, H. Plattner, A. Zeier, P. Cudré-Mauroux, and S. Madden. HYRISE—A Main Memory Hybrid Storage Engine. PVLDB, 4(2):105-116, 2010] and [J. Krüger, C. Kim, M. Grund, N. Satish, D. Schwalb, J. Chhugani, H. Plattner, P. Dubey, and A. Zeier. Fast Updates on Read-Optimized Databases Using Multi-Core CPUs. PVLDB, 5(1):61-72, 2011] that use relational databases have very distinctive schema properties. First the relational tables have many attributes and thousands of tables are used together by a single application. As a consequence, it is important that the layout process scales with both properties.

To underline this assumption we perform an experiment where we create a table with a varying number of attributes and add as many queries as attribute, each query spanning more attributes than the previous one. As a result of this worst-case scenario we have as many primary partitions as attributes, which results in the longest computation time for our process.

Figure 6:
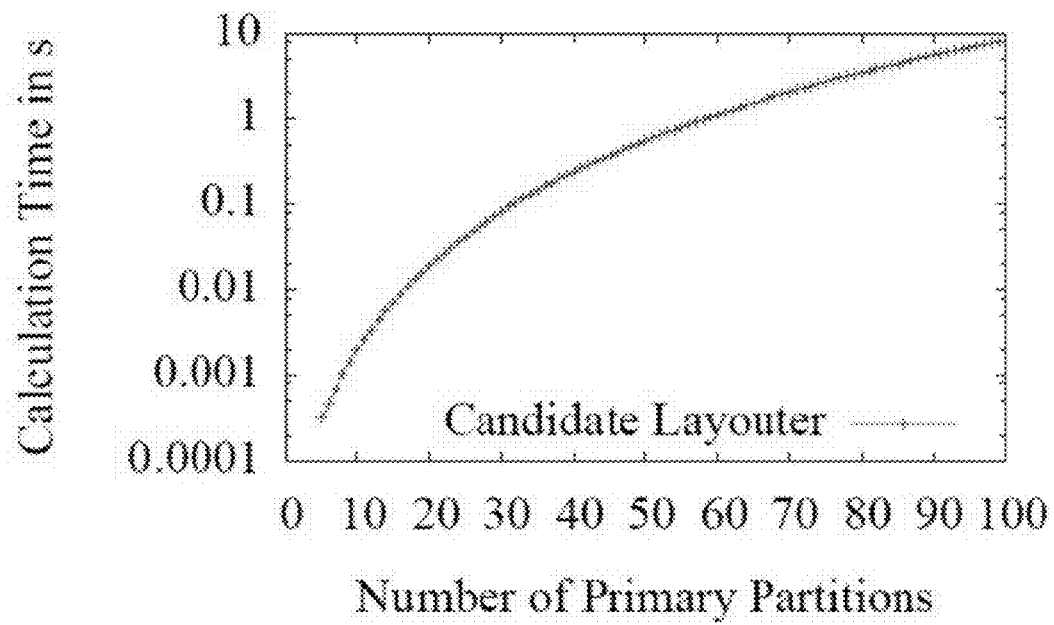
FIG. 6 shows the initial layout performance with increasing number of primary partitions.

FIG. 6 shows the result of this experiment and highlights the exponential behavior of our process in this case. Assuming that in an online reorganization scenario our system will observe the 1000 most important tables used by the application and each of those tables belongs to the category of the 100 primary partitions, we would need at least 1000*10 s≈3 h to compute the optimal layout for those tables. Using our incremental process we can reduce the time to a point where it becomes acceptable to run the workload calculation on an almost continuous basis in the background.

6.2 Layout Generation Performance

The baseline for the applicability of the incremental layout process is its performance. Only when the performance is sufficient online database reorganization becomes possible. To compare the performance of our layout process, we focus on non-amortized layout generation costs, however for our experiments we always report the amortized cost as well for completeness.

The non-amortized costs to determine the best possible layout contain only those costs that will occur during a single epoch. Thus, these costs do not include the cost for determining the previous optimal layout, but only the cost to calculate the current optimal layout.

Figure 7:
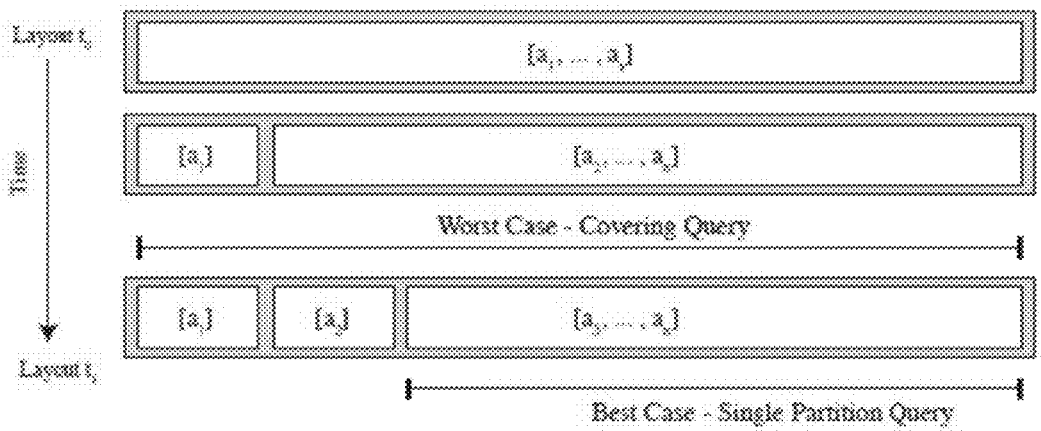
FIG. 7 explains workload description, showing the difference between the covering query (worst case) and the single partition query (best case).

We now present the results of an experiment that we executed in two different variations. Based on the description shown in FIG. 7 we start with a single partition layout at epoch $t_0$. Now we add a new query at each following epoch. As the incremental layout process analyzes the number of containers the new query touches, we differentiate two cases. In the first case we add a query that accesses all attributes and thus all containers. In the second cases we add a new query that only touches a single container.

Figure 8:
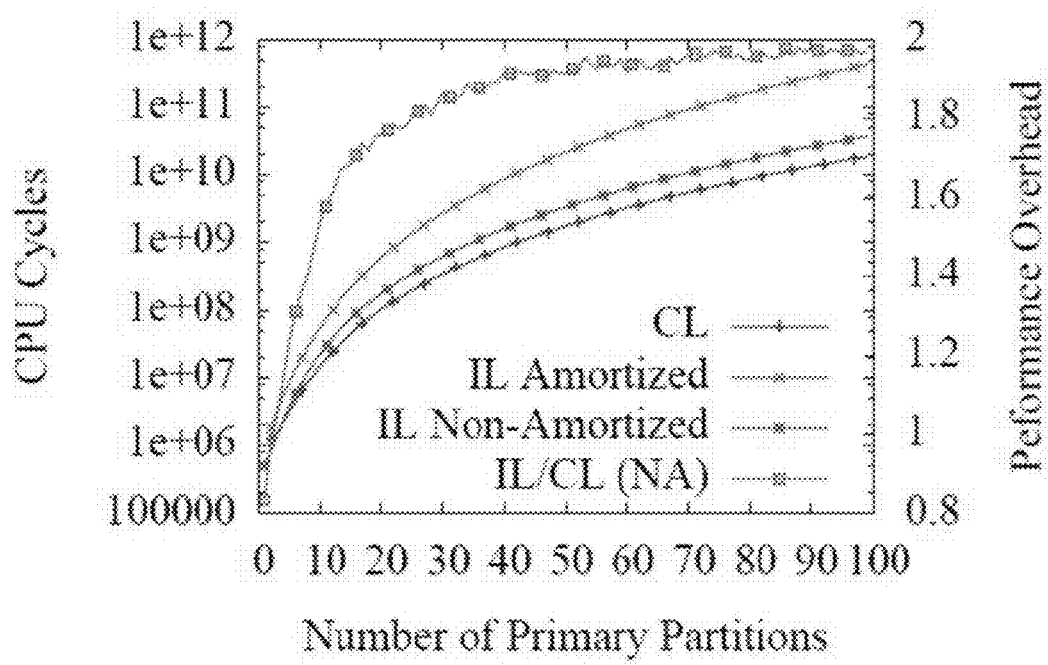
FIG. 8 shows a comparison of layout computation cost for the candidate layout process (CL) and incremental layout process (IL). Each query is incrementally creating a covering set of attributes.

FIG. 8 shows the results of an experiment where each new query touches all attributes that were touched by the previous queries. This means that the first query touches only the first attribute, while the second query performs an operation on the first and the second attribute, until the last query that is added to the workload touches all attributes from 1 . . . n where n is the number of primary partitions that are evaluated in this workload. In this experiment we use an input table that has 100 attributes and thus the largest number of primary partitions is 100.

Figure 9:
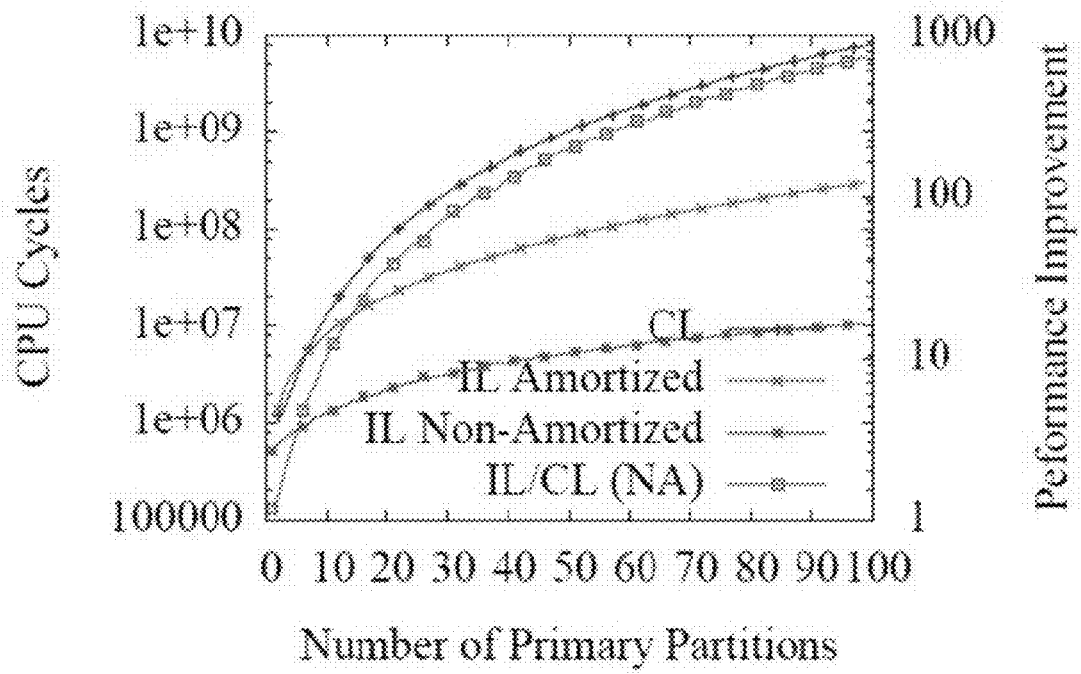
FIG. 9 shows a comparison of layout computation costs for candidate (CL) and incremental layout (IL) process where each new query affects a disjoint set of attributes.

In the results, we report numbers for the candidate layout process and the amortized cost for the incremental layout process. Since the incremental layout process has to perform more work to determine the optimal layout for the given workload, we expect it to be slower compared to the original candidate layout process. The results in FIG. 8 support this observation, however the performance overhead is bound to a factor of two in this scenario. The amortized cost in this example includes all intermediate steps to compute the optimal layout. As expected these cost are significantly higher. In the second experiment which we define as the best-case scenario, the new query always splits the remaining layout container and thus only affects one existing query. As a result, only two partitions need to be inspected. The rest of the computation cost is divided into filtering the affected queries and rewriting the queries and output sets. When comparing the cost for computing the optimal layout, the performance of the incremental layout process is vastly advantageous since it detects the affected partitions and queries and only needs to evaluate the changed workload on them. The results for this experiment are shown in FIG. 9. The speedup of the incremental layout process mainly depends on the difference in number of primary partitions to evaluate. For a table with 100 primary partitions the incremental layout process can be three orders of magnitude faster.

In addition to the non-amortized costs of the incremental and candidate layout process FIG. 9 also reports the amortized cost, including all sub-layout steps. In the previous experiment (FIG. 8) the amortized cost for the incremental layout were close to two orders of magnitude higher than the costs of the candidate layout process. For the second experiment this is not the case. The amortized costs for finding the optimal layout are close to two orders of magnitude lower than the costs of the candidate layout process. The reason behind this difference is that the runtime of the second phase of the candidate layout process is dependent on the number of evaluated primary partitions. This evaluation is exponential and in the incremental layout process, even when looking at the amortized cost, the number of partitions to evaluate is constantly low. This explains the performance gain of the incremental layout process compared to the candidate process in the amortized scenario.

As a consequence of this optimization, an extension of the candidate layout process will first cluster the primary partitions into the smallest number of disjoint sets where queries will not overlap. Using this optimization the performance of the candidate layout process can be further improved but this modification does not change the general process behavior. Summary.

In this section we evaluated the performance of our incremental layout process and explained its properties. Coming back to the introductory example: The performance properties of the incremental process allow reducing the time required to reevaluate the workload to compute an optimal layout by a factor up to 1000. This means that computing the optimal layout for the 1000 most used table would be reduced from 3 h to 10 s in this case.

6.3 Merge Performance

In this section, we show the impact of choosing a different layout for a table that is merged. As stated in Section 4.3, the layout modification only affects the update values phase. In [J. Krüger, C. Kim, M. Grund, N. Satish, D. Schwalb, J. Chhugani, H. Plattner, P. Dubey, and A. Zeier. Fast Updates on Read-Optimized Databases Using Multi-Core CPUs. *PVLDB*, 5(1):61-72, 2011] we presented parallelization approaches that look at per-attribute scalability. These concepts remain valid for the modified version of our merge implementation. The only difference from the original implementation is the scheduling of the different steps. In the present cast, we first schedule the merging of all attribute dictionaries, and then perform the value updates.

Figure 10:
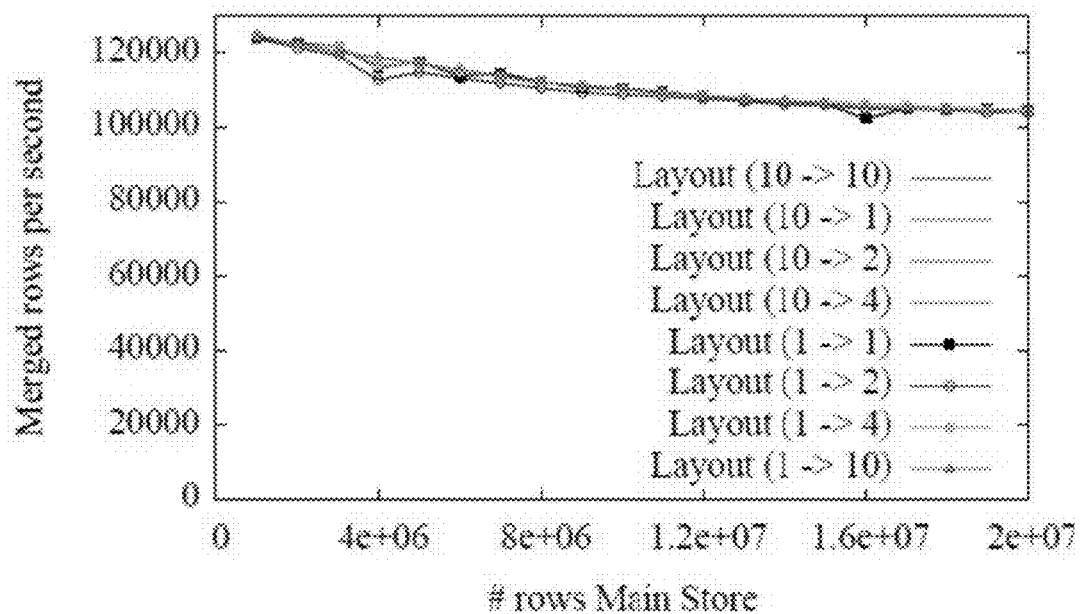
FIG. 10 shows the merge throughput for different layouts. Merging occurs into the same layout, and multiple partitions.

To assess the validity of our approach, we loaded a table with ten columns and merged the table with a delta size of 10% of the main table (e.g., if the main table is 10M rows, the delta size will be 100 k rows). Furthermore, we experimented with a different target layout with one, two, four or ten partitions in the target layout. FIG. 10 shows the results of this experiment and supports our initial statement. The performance is almost identical for all different target layouts and as a result we conclude that changing the layout for a input table during the merge process does not incur any additional cost.

The reason why all write operations are equally expensive can be explained by looking at the amount of data that is touched during the merge process. Since all data are touched, all cache lines corresponding to the tables are touched. Since modern prefetching algorithms will detect multiple contiguous strides in different directions, the full access will not differ between the different layouts, in contrast to the partial access executed in typical queries. The copy values phase of the merge process can be compared to a full projection operator as shown in [M. Grund, J. Krüger, H. Plattner, A. Zeier, P. Cudré-Mauroux, and S. Madden. HYRISE—A Main Memory Hybrid Storage Engine. PVLDB, 4(2):105-116, 2010] which yields identical behavior for column and row-wise storage.

6.4 Change Detection

Based on the properties of the incremental layout process, this section describes the properties of our change detection implementation. To assess the performance of our epoch weight based approach, we implemented several other change managers, each with different properties.

Naive Switches the layout every time a new optimal layout is detected.

Cumulative Accumulates the performance gain for each epoch until those are larger than the transition costs.

Smoothed In this process the delta costs of the current layouts are multiplied by a smoothing value that is computed based on the number of epochs the current layout is considered as optimal; this values is multiplied with a smoothing function and accumulated until the accumulated performance gain is larger than the transition costs. The smoothing function we use is:

$$\text{epoch\_weight}(h, n, s) = \left\lceil n\left(\frac{\arctan(s*h)*2}{\pi}\right)\right\rceil \quad (6)$$

where $h \in [1 \ldots \infty)$ is the number of stable epochs and n and s are smoothing parameters, s defines the slope for the smoothing function and n defines the value range between $[1 \ldots n]$ Windowed The change manager keeps track of the accumulated delta costs between the two layouts in a specified moving window. The accumulative buffer is only reset if the transition to a new layout is triggered.

Simple Epoch Weight First implementation of our epoch weight process that multiplies the delta costs between the current layouts by the number of epochs the optimal layout is considered stable.

History Epoch Weight The implementation of our change detection process as described in Section 5.1.

The motivation for the smoothed change detection using the smoothing function in Equation (6) is that such a function yields better control over the number of epochs required until the layout transition is triggered. However, in practice it is difficult to find a set of fitting parameters for the smoothing function that always yield the best possible result. To compare the applicability of the different change managers and their properties, we defined four different workload types and compare the accumulated penalty for each change manager. The accumulative workload penalty contains those costs where the current layout of the table was not optimal.

We consider a number of test workloads:

Two Step The two step workload is taken from the initial example in Section 5.1, where two workload changes are applied shortly after another, to check whether the change manager switches to the new layout too early.

Alternating Two workloads switch from one to the other in constant fixed intervals. The goal is here to compare how many cycles it takes until the layout transition is triggered.

Alternating, Random Same as the above workload, but the interval between the two epochs is not fixed but distributed using a Poisson Distribution ($\lambda=5$).

Random The workload is changed randomly from a selection of 5 distinct workloads. The number of epochs between two workloads is determined randomly from an uniform distribution.

Since the number of layout switches can be different for each workload/change manager implementation, we record the overhead costs as the delta costs for each epoch between the optimal and current layout including the transition costs if a transition occurs. All workloads are executed for 100,000 epochs. For the smoothed and windowed change manager, we use parameters that allow triggering a layout switch. However, this leads to the first observation of the experiment: The History Epoch change process is able to outperform all approaches without having to configure any additional parameter (e.g., window size or smoothing parameter). When we assume the optimal cost of 1000 per epoch and 100,000 epochs the total overhead for our system is 14% in the random workload and only 5% for the alternating workload including the transition to the optimal layout if necessary.

In the case of the alternating workload, the number of epochs between two changes is chosen to be large enough to accumulate a performance gain even for the naive process. The advantage of our history based process is clearly that it keeps track of the last cycle when the layout was active and is able to switch back very fast to adopt this layout again.

To summarize, our history based epoch weight process is able to outperform all the other approaches in all cases. Furthermore, the process does not require any a priori knowledge from the database administrator (no tuning parameter). Our process is able to adapt swiftly to important workload changes and provides the best performance both for continuously evolving workloads and for statically repeating workloads (as in day/night cycles).

TABLE 3

Comparing the overhead costs (in cache misses) of the change manager including the transition costs, smaller is better

| Workload | | | | | | Simple Epoch | History Epoch |
|---|---|---|---|---|---|---|---|
| Kind | # Workloads | Naïve | Smoothed | Cumulative | Windows | Weight | Weight |
| Two Step | 2 | 2150 | 2350 | 1700 | 2050 | 1650 | 1650 |
| Alternating | 5064 | 5823080 | 9244680 | 7781600 | 8885640 | 8063800 | 5754310 |
| Alternating, Random | 30380 | 32636600 | 32563800 | 32801000 | 32188700 | 32563800 | 28793100 |
| Random | 13140 | 15083130 | 15868570 | 15636590 | 15522700 | 16446150 | 14869770 |
| Best | — | — | — | — | — | 1 | 4 |

7. CONCLUSIONS

In this paper we presented a novel approach to online reorganization of main memory database systems that in contrast to existing work focuses on reorganizing the primary data persistence instead of copies or secondary data structures like indexes. We made three main contributions. First, we showed how to leverage delta-merge and re-compression operations to modify the layout of an input table with negligible overhead costs. Second, we presented an incremental layout process that allows to compute the optimal layout for a relational table up to three orders of magnitude faster than the state-of-the-art method. Using this process, it becomes possible to reduce the time required to determine the optimal layout for 1000 tables having 100 primary partitions each from ≈3 h down to 10 s. Finally, we presented a change detection process that allows to gracefully adapt to new workloads and avoids unnecessary layout changes while allowing for fast layouts adaptation for recurring workloads. In a benchmark we can show that the overhead of our process is only 5% including the transition costs for a cyclic workload, compared to always considering the cost for the optimal layout. All those techniques were implemented and evaluated in our HYRISE system, but are however not limited to this system and can be applied to any main-memory database supporting multiple ways of storing the primary copy of the data.

In the above description, the terms "vertical partition" and "container" are used. In general, these terms are synonymous. When precision is desired, the term "container" may be used to refer specifically to the physical data storage, and the term "vertical partition" may be used to refer specifically to the schema that describes the container. It is to be noted that one of ordinary skill in the art would thus understand that the term "container" excludes any context that does not refer to the actual, physical storage. For example, one of ordinary skill would not consider the columns of a table in a database to be arranged in "containers" unless the columns of that table were specifically described as being physically stored as such; in the absence of such description, one of ordinary skill would understand that the tuples of the table are stored according to row storage, as in most existing transactional data processing systems. As discussed above, data elements in a container may be physically stored in the storage medium (e.g., memory, disk) in a list of contiguous blocks. Thus, the physical arrangement of the data in the container contributes to enhanced read access thereof, e.g. when performing queries, due to the sequential data accesses enabled by this physical arrangement.

The term "column store" used in the above description refers to storing the data of a table column-by-column, instead of row-by-row as in most existing transactional data processing systems. "Column store" describes that the values of a first attribute of multiple database records are physically stored in the storage medium consecutively, followed (if present) by the values of a second attribute of the same multiple database records. Thus, one of ordinary skill in the art would not consider a table in a database to be stored according to column storage unless the physical arrangement of the storage is specifically described as such; a table in a database is not stored according to column storage just because the table has columns, since the columns may be logically defined according to the schema instead of physically arranged according to column storage.

In the above description, the term "layout" is used. In general, a "layout" of a relational table is a set of one or more vertical partitions. In each vertical partition one or more attributes of the table are stored. The set of vertical partitions is a disjoint set, i.e., the attributes are partitioned into vertical partitions such that the vertical partitions do not overlap, i.e., each attribute belongs to one and only one partition. Thus, the layout of the partitions corresponds to the layout of the containers, that is, the physical arrangement of the data storage. When precision is desired, the term "physical layout" may be used to describe the physical arrangement of the data in the containers in the storage medium. Thus, one of ordinary skill in the art would understand that changing the layout refers to changing the physical arrangement of data in the storage medium. As discussed above, changing the layout to account for the workload improves the performance of the system by virtue of the changed physical arrangement. One of ordinary skill would thus not consider changing the schema of a table, or adding columns, or deleting columns, or rearranging columns, to be changing the layout, unless it is specifically described that the physical arrangement of the data is changed.

In the above description, the term "in-memory database" is used. In general, an in-memory database is a database management system that primarily relies on main memory for computer data storage. It is contrasted with database management systems which employ a disk storage mechanism. Main memory databases are faster than disk-optimized databases since the internal optimization algorithms are simpler and execute fewer CPU instructions. Accessing data in memory reduces the disk seek when querying the data which provides faster and more predictable performance than disk. Since all computer systems include a memory and disk, one of ordinary skill in the art would not consider a database to be an in-memory database unless the use of the disk is specifically excluded. Similarly, a database system may perform caching in memory as part of its normal database processing; such caching does not make it an in-memory database system unless the use of the disk is specifically excluded. An in-memory database system may include a disk or other persistent storage, e.g. for adding durability by storing snapshots, but what defines it as an in-memory database is that transactional and/or analytical workloads are processed fully in the main memory; these features are not present in a system that is not specifically described as an in-memory database.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

The invention claimed is:

1. A computer-implemented database online reorganization method for dynamically adapting a database partitioning layout of a database containing tables, wherein the tables are vertically partitioned into containers, each container containing one or more attributes of one table, the method comprising:
   analyzing, by a workload analysis tool of a computer system, a workload on a set of tables of the database, the workload comprising queries;
   detecting, by the workload analysis tool of the computer system, a workload change of the workload;
   analyzing, by a workload evaluation tool of the computer system, if a new partitioning layout for the set of tables is considered optimal in view of the workload change; and
   deciding, by the workload evaluation tool of the computer system, whether the partitioning layout of the set of tables is switched to the new partitioning layout,
   wherein deciding whether the partitioning layout of the set of tables is switched to the new partitioning layout comprises:
      determining the workload costs of the current partitioning layout, the workload costs of the partitioning layout that is considered optimal in view of the workload change, and the penalty costs as the difference between the workload costs of the current partitioning layout and the workload costs of the partitioning layout that is considered optimal in view of the workload change;
      determining the transition costs for changing the current partitioning layout to the partitioning layout that is considered optimal in view of the workload change;
      determining weighted penalty costs by multiplying the penalty costs with a weight factor;
      determining new accumulated penalty costs by adding the weighted penalty costs to previously accumulated penalty costs; and
      triggering the switching of the partitioning layout of the set of tables from the current partitioning layout to the partitioning layout that is considered optimal in view of the workload change if the new accumulated penalty costs is larger than the transition costs.

2. The method of claim 1, wherein detecting a workload change of the workload comprises:
   determining a difference query indicative of the difference between a new workload and a previous workload.

3. The method of claim 2, wherein analyzing if a new partitioning layout for the set of tables is considered optimal in view of the workload change comprises:
   determining a set of containers consisting of all containers of the set of tables that are accessed by the difference query;
   determining a set of queries consisting of all queries of the previous workload that access any container of the set of containers;
   determining a set of attributes consisting of all attributes of the set of containers that are accessed by any query of the set of queries; and
   determining an optimal partitioning layout for the set of attributes.

4. The method of claim 3, wherein determining an optimal partitioning layout for the set of attributes comprises:
   determining a set of primary partitions consisting of all primary partitions for the set of tables;
   determining the workload costs of the new workload for every candidate partition of a first set of candidate partitions, the first set of candidate partitions consisting of all partitions obtained by merging two or more primary partitions of the set of primary partitions;
   discarding a candidate partition from the first set of candidate partitions if the workload costs of the candidate partition is equal to or greater than the sum of the individual workload costs of the primary partitions forming the candidate partition, resulting in a second set of candidate partitions; and
   determining the workload costs of the new workload for all possible partitioning layouts obtained by combining candidate partitions from the second set of candidate partitions.

5. The method of claim 1, wherein determining the workload costs of the current partitioning layout is performed repeatedly, wherein the time interval between one determination of workload cost and the next determination of workload costs defines an epoch.

6. The method of claim 5, further comprising:
   resetting the previously accumulated penalty costs if the partitioning layout that is considered optimal in view of the workload change in the present epoch is different from the partitioning layout that was considered optimal in view of the workload change in the previous epoch.

7. The method of claim 5, further comprising:
   increasing the weight factor in each epoch.

8. The method of claim 5, further comprising:
   storing the number of epochs in which each partitioning layout was considered optimal; and
   when a new partitioning layout is considered optimal in view of the workload change, using the stored value of number of epochs in which the new partitioning layout was considered optimal as weight factor.

9. The method of claim 8, further comprising:
   storing statistical information about the executed queries for each workload.

10. The method of claim 1, further comprising:
   switching the layout of the set of tables to the new layout.

11. A computer system for dynamically adapting a database partitioning layout of a database stored on the computer system, the database containing tables, wherein the tables are vertically partitioned into containers, each container containing one or more attributes of one table, the computer system comprising:
   a memory that is configured to store the database; and
   a processor that is configured to execute a workload analysis tool and a workload evaluation tool, wherein the workload analysis tool is configured to analyze a workload on a set of tables of the database, the workload comprising queries;

wherein the workload analysis tool is configured to detect a workload change of the workload, wherein the workload evaluation tool is configured to analyze if a new partitioning layout for the set of tables is considered optimal in view of the workload change, and wherein the workload evaluation tool is configured to decide whether the partitioning layout of the set of tables is switched to the new partitioning layout, wherein the workload evaluation tool decides whether the partitioning layout of the set of tables is switched to the new partitioning layout by:

determining the workload costs of the current partitioning layout, the workload costs of the partitioning layout that is considered optimal in view of the workload change, and the penalty costs as the difference between the workload costs of the current partitioning layout and the workload costs of the partitioning layout that is considered optimal in view of the workload change;

determining the transition costs for changing the current partitioning layout to the partitioning layout that is considered optimal in view of the workload change;

determining weighted penalty costs by multiplying the penalty costs with a weight factor;

determining new accumulated penalty costs by adding the weighted penalty costs to previously accumulated penalty costs; and triggering the switching of the partitioning layout of the set of tables from the current partitioning layout to the partitioning layout that is considered optimal in view of the workload change if the new accumulated penalty costs is larger than the transition costs.

12. The computer system of claim 11, wherein the processor is further configured to execute a storage manager tool, wherein the storage manager tool is configured to switch the layout of the set of tables to the new layout, according to the workload evaluation tool.

13. The computer system of claim 11, wherein determining the workload costs of the current partitioning layout is performed repeatedly, wherein the time interval between one determination of workload cost and the next determination of workload costs defines an epoch.

14. The computer system of claim 13, further comprising:
resetting the previously accumulated penalty costs if the partitioning layout that is considered optimal in view of the workload change in the present epoch is different from the partitioning layout that was considered optimal in view of the workload change in the previous epoch.

15. The computer system of claim 13, further comprising:
increasing the weight factor in each epoch.

16. A non-transitory computer readable medium for use on a computer system containing computer-executable programming instructions for performing, when executed on the computer system, a method comprising:

analyzing, by a workload analysis tool of a computer system, a workload on a set of tables of the database, the workload comprising queries;

detecting, by the workload analysis tool of the computer system, a workload change of the workload;

analyzing, by a workload evaluation tool of the computer system, if a new partitioning layout for the set of tables is considered optimal in view of the workload change; and deciding, by the workload evaluation tool of the computer system, whether the partitioning layout of the set of tables is switched to the new partitioning layout, wherein deciding whether the partitioning layout of the set of tables is switched to the new partitioning layout comprises:

determining the workload costs of the current partitioning layout, the workload costs of the partitioning layout that is considered optimal in view of the workload change, and the penalty costs as the difference between the workload costs of the current partitioning layout and the workload costs of the partitioning layout that is considered optimal in view of the workload change;

determining the transition costs for changing the current partitioning layout to the partitioning layout that is considered optimal in view of the workload change;

determining weighted penalty costs by multiplying the penalty costs with a weight factor;

determining new accumulated penalty costs by adding the weighted penalty costs to previously accumulated penalty costs; and triggering the switching of the partitioning layout of the set of tables from the current partitioning layout to the partitioning layout that is considered optimal in view of the workload change if the new accumulated penalty costs is larger than the transition costs.

17. The non-transitory computer readable medium of claim 16, wherein determining the workload costs of the current partitioning layout is performed repeatedly, wherein the time interval between one determination of workload cost and the next determination of workload costs defines an epoch.

18. The non-transitory computer readable medium of claim 17, further comprising:
resetting the previously accumulated penalty costs if the partitioning layout that is considered optimal in view of the workload change in the present epoch is different from the partitioning layout that was considered optimal in view of the workload change in the previous epoch.

19. The non-transitory computer readable medium of claim 17, further comprising:
increasing the weight factor in each epoch.

20. The non-transitory computer readable medium of claim 16, further comprising:
switching the layout of the set of tables to the new layout.

\* \* \* \* \*